United States Patent [19]
Kreitzer

[11] Patent Number: 5,936,776
[45] Date of Patent: Aug. 10, 1999

[54] FOCUSABLE FRONT PROJECTION LENS SYSTEMS FOR USE WITH LARGE SCREEN FORMATS

[75] Inventor: Melvyn H. Kreitzer, Cincinnati, Ohio

[73] Assignee: U.S. Precision Lens Inc., Cincinnati, Ohio

[21] Appl. No.: 08/928,445

[22] Filed: Sep. 12, 1997

Related U.S. Application Data

[60] Provisional application No. 60/027,113, Sep. 27, 1996.

[51] Int. Cl.⁶ .................................................. G02B 3/00
[52] U.S. Cl. ........................................... 359/649; 359/708
[58] Field of Search .................................. 359/649–651, 359/708, 713–715, 754–756

[56] References Cited

U.S. PATENT DOCUMENTS

| | | | |
|---|---|---|---|
| Re. 35,310 | 8/1996 | Moskovich | 359/649 |
| 4,300,817 | 11/1981 | Betensky | 359/651 |
| 4,348,081 | 9/1982 | Betensky | 359/650 |
| 4,526,442 | 7/1985 | Betensky et al. | 359/651 |
| 4,682,862 | 7/1987 | Moskovich | 359/649 |
| 4,697,892 | 10/1987 | Betensky | 359/650 |
| 4,755,028 | 7/1988 | Moskovich | 359/650 |
| 4,776,681 | 10/1988 | Moskovich | 359/649 |
| 4,801,196 | 1/1989 | Betensky | 359/649 |
| 4,815,831 | 3/1989 | Bentensky | 359/649 |
| 4,900,139 | 2/1990 | Kreitzer | 359/649 |
| 4,963,007 | 10/1990 | Moskovich | 359/649 |
| 5,055,922 | 10/1991 | Wessling | 358/60 |
| 5,130,850 | 7/1992 | Toide | 359/649 |
| 5,148,320 | 9/1992 | Toide | 359/649 |
| 5,212,597 | 5/1993 | Yamada | 359/649 |
| 5,237,456 | 8/1993 | Yoshioka | 359/649 |
| 5,296,967 | 3/1994 | Moskovich | 359/649 |
| 5,309,283 | 5/1994 | Kreitzer | 359/649 |
| 5,329,363 | 7/1994 | Moskovich | 348/781 |
| 5,357,373 | 10/1994 | Yoshioka et al. | 359/649 |
| 5,367,405 | 11/1994 | Sado | 359/649 |
| 5,404,246 | 4/1995 | Kaneko et al. | 359/649 |
| 5,455,713 | 10/1995 | Kreitzer | 359/649 |
| 5,659,424 | 8/1997 | Osawa et al. | 359/714 |
| 5,808,804 | 9/1998 | Moskovich | 359/649 |

FOREIGN PATENT DOCUMENTS

| | | |
|---|---|---|
| 0 764 865 | 3/1997 | European Pat. Off. . |
| 43 44 289 A1 | 8/1994 | Germany . |
| WO97/41477 | 11/1997 | WIPO . |

*Primary Examiner*—Georgia Epps
*Assistant Examiner*—Jordan M. Schwartz
*Attorney, Agent, or Firm*—Maurice M. Klee

[57] ABSTRACT

Variable focus, liquid coupled, front projection, lens systems (13) are provided for use with large screens (14), e.g., screens having a full diagonal of 1.5 meters and above. The lens systems (13) can be focused over a range of screen diagonals of at least 1.5:1 while maintaining a high level of performance as evidenced by relatively small changes in the lens system's modulation transfer function (MTF) as it is focused. The lens systems can include four lens units, namely, a positive first lens unit having a positive subunit and a negative subunit, a positive second lens unit having four lens elements at least one of which is negative, a negative corrector lens unit having an aspherical lens element, and a third lens unit which is liquid coupled to a cathode ray tube (16) during use.

41 Claims, 7 Drawing Sheets

FOCUSABLE FRONT PROJECTION LENS SYSTEMS FOR USE WITH LARGE SCREEN FORMATS

CROSS REFERENCE TO RELATED PROVISIONAL APPLICATION

This application claims the benefit under 35 USC §119(e) of U.S. Provisional Application Ser. No. 60/027,113 filed Sep. 27, 1996.

FIELD OF THE INVENTION

This invention relates to projection lens systems for use in projection televisions and, in particular, to projection lens systems which are optically coupled to a cathode ray tube (CRT) and yet can be focused over a wide range of conjugates, e.g., can be used with screens having a wide range of sizes, while still achieving a high level of performance as indicated by a relatively constant modulation transfer function (MTF) over said range of conjugates.

BACKGROUND OF THE INVENTION

Projection lens systems for CRT projection televisions have undergone continuing development during the past fifteen years or so. Examples of such systems can be found in Betensky, U.S. Pat. Nos. 4,300,817, 4,348,081, 4,526,442, 4,697,892, and 4,801,196; Moskovich, U.S. Pat. Nos. 4,682, 862, 4,755,028, and 4,776,681; and Toide, U.S. Pat. No. 5,148,320.

Color images for projection televisions are normally obtained by combining images from three color CRTs, i.e., a red CRT, a green CRT, and a blue CRT. The phosphors used in commercially available CRTs do not emit light at a single wavelength. In particular, green phosphors have significant sidebands in blue and red. Similar polychromaticity exists for red and blue phosphors, but to a lesser extent.

For many consumer applications, lens systems uncorrected for color can be used, notwithstanding the color spread of the CRTs. For more demanding applications, however, such as high definition television, data displays, or systems which operate at a high magnification, color correction is needed to avoid visible color fringing and/or a loss of image contrast. Examples of projection lens systems which provide at least some color correction include Betensky, U.S. Pat. No. 4,815,831; Kaneko et al., U.S. Pat. No. 5,404,246; Kreitzer, U.S. Pat. Nos. 4,900,139, 5,309, 283, and 5,455,713; Moskovich, U.S. Pat. No. 4,963,007; Toide, U.S. Pat. No. 5,130,850; and Yoshioka, U.S. Pat. No. 5,237,456.

A long standing problem in the field of projection lenses for projection televisions has been the provision of a high performance lens system which is optically coupled to a CRT and yet can be focused over a wide range of conjugates without substantial deterioration in the lens' performance. As is known in the art, optical coupling occurs when the interface between the lens system and the CRT is through a coupling fluid (liquid), as opposed to air. As a result of such liquid coupling, the entire lens system cannot be moved relative to the CRT for focusing at different conjugates, as can be done when the coupling is through air. Rather, a portion of the lens system must remain fixed to the CRT to retain the coupling fluid in place. Accordingly, focusing of the lens system involves dividing the system apart. Prior to the present invention, such dividing to focus has resulted in a substantial decrease in the performance of the system, i.e., a substantial increase in the system's aberrations, especially when the focusing has been over a wide range of conjugates.

The ability of a projection lens system to focus over a wide range of conjugates is particularly important for front projection systems used with large viewing screens in auditoriums, lecture halls, and the like. As is commonly known, such viewing screens come in a variety of sizes. What manufacturers and customers both desire is a projection television which can accommodate such size variation without the need to substitute lens elements and without sacrificing performance.

In optical terms, to meet this need, the projection lens used in the projection television needs to be focusable. The present invention addresses this need by providing a fully color corrected, optically coupled, front projection, lens system which can be focused over a wide range of screen sizes (screen diagonals) and can still maintain high performance as evidenced by a MTF which remains substantially uniform over said range of screen diagonals.

SUMMARY OF THE INVENTION

In accordance with certain of its aspects, the invention provides a variable focus projection lens system for forming an image on a screen which has a diagonal (full diagonal) greater than 1.5 meters, said system comprising:

(a) a fixed lens unit which is optically coupled to a cathode ray tube by a coupling fluid during use of the lens system; and (b) a moveable lens unit which is moved relative to the fixed lens unit during focusing of the image on the screen, said focusing being able to accommodate a range of screen diagonals of at least 1.5:1;

said fixed lens unit, moveable lens unit, and coupling fluid having a modulation transfer function at the cathode ray tube which varies over said range of screen diagonals such that the ratio $R_{Min/Max}$ of the minimum value of the modulation transfer function at 5 cycles/millimeter to the maximum value of the modulation transfer function at 5 cycles/millimeter over said range of screen diagonals for any field position up to 0.85 of the maximum field is greater than 0.5.

In certain preferred embodiments, $R_{Min/Max}$ is greater than 0.7 over said 1.5:1 range of screen diagonals. In other preferred embodiments, $R_{Min/Max}$ is greater than 0.5 over ranges of screen diagonals of 3.0:1 and higher. In general, the values of $R_{Min/Max}$ which the lens system achieves increase as the diagonal range decreases and vice versa.

Preferably, the lens system comprises in order from the system's image side:

(a) a first lens unit which primarily corrects aperture dependent aberrations, said first lens unit having an optical power $\Phi_1$ and comprising a first subunit having an optical power $\Phi_{S1}$ and a second subunit having an optical power $\Phi_{S2}$ each of said subunits having at least one aspherical surface;

(b) a second lens unit having an optical power $\Phi_2$ and comprising in order from the system's image side:

a negative first lens element composed of glass;

a positive second lens element composed of glass;

a positive third lens element composed of glass; and a fourth lens element which comprises at least one aspherical surface;

(c) a corrector lens unit having an optical power $\Phi_{CR}$ and comprising a plastic lens element both of whose surfaces have an overall shape which is concave to the image and at least one of whose surfaces is aspherical; and (d) a third lens unit which provides correction for the field curvature of the lens system, said third lens unit comprising a lens element which is concave to the image and is in contact with said coupling fluid during use of the lens system, said third lens unit and said coupling fluid having an optical power $\Phi_3$;

wherein the lens system and the coupling fluid used to couple the system to the CRT have an optical power $\Phi$, and wherein $\Phi_1, \Phi_{S1}, \Phi_{S2}, \Phi_2, \Phi_{CR}$, and $\Phi_3$ satisfy the following conditions:

(i) $\Phi_1 > 0$;
(ii) $\Phi_{S1} > 0$;
(iii) $\Phi_{S2} < 0$;
(iv) $\Phi_2/\Phi > 0.7$;
(v) $\Phi_{CR} < 0$; and
(vi) $\Phi_3 < 0$.

The MTF values referred to herein are calculated values (as opposed to measured values) determined for the various lens designs via the auto-correlation method. The modulation of the transfer function is compared in all cases, it being assumed that the phase is satisfactorily linear. All modulation values are monochromatic and are calculated at the short (CRT) conjugate. Modulation values for a given lens at any particular conjugate are calculated in a single focal plane at, for example, five field points, e.g., 0% of the field (on axis), 35%, 70%, 85%, and 100%. The choice of focal plane is arrived at by a consideration of the overall performance at a series of through-focus planes. The design strategy is to maximize the available depth of focus over all five field points.

In comparing MTF values from lens to lens or, in the case of the present invention, from conjugate to conjugate for the same lens, the criterion used is the ratio of the minimum modulation to the maximum modulation achieved at 5 cycles/mm in a single focal plane (specifically, the CRT phosphor surface) over all the field points ranging from the axis out to 0.85 of the maximum field. In judging the degree of stability of image quality with conjugate change, this criterion is used to compare MTF values on a field point by field point basis, e.g., the MTF is calculated at 0%, 35%, 70%, and 85% of the maximum field for the largest screen diagonal and again for the smallest screen diagonal, and the ratio of minimum modulation to maximum modulation at each field point is calculated. The lowest ratio of MTF values is then used as an indication of the degree of conjugate stability. This results in ratios that can range in value from 0 to 1, with 1 representing perfect conjugate stability. Both sagittal and tangential MTFs are compared in arriving at these ratios, with sagittal values being compared with sagittal values, and tangential values with tangential values. The 5 cycles/mm value is used in these calculations since it generally corresponds to 1024 horizontal lines of TV resolution.

As shown in Table 5 below, the lens systems of the invention achieve ratios of MTF values which are above 0.5 for screens larger than 1.5 meters and for ranges of screen diagonals of at least 1.5:1. The lens systems thus provide a level of conjugate stability not previously achieved in high performance, optically coupled, projection lens systems.

Figure 1A:
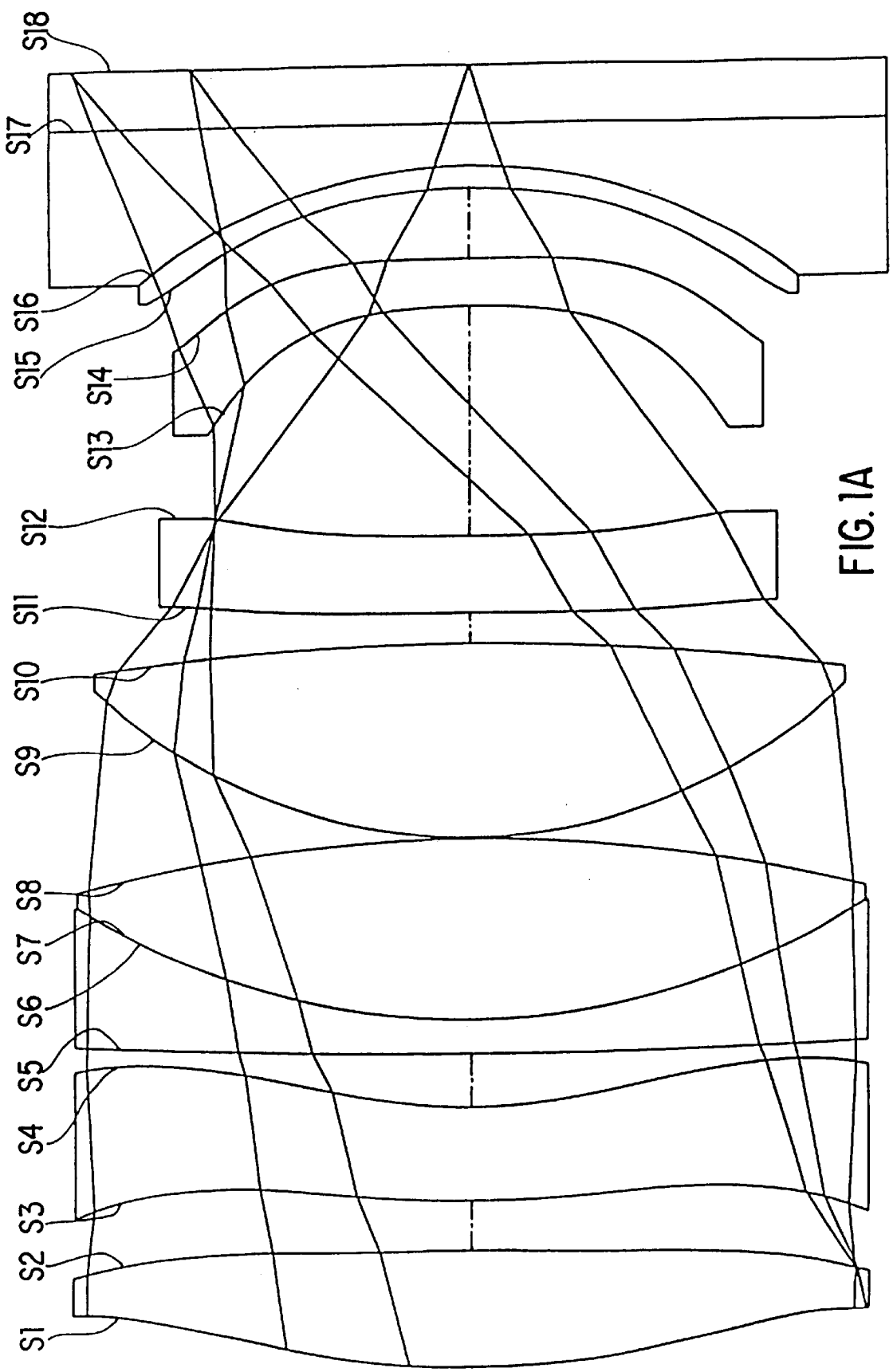
FIGS. 1A, 2, and 3 are schematic side views of lens systems constructed in accordance with the invention.

The foregoing drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The lens systems of the invention preferably include a first lens unit, a second lens unit, a third lens unit, and a corrector lens unit wherein: 1) the first lens unit preferably includes a first lens subunit having a relatively strong positive optical power and a second lens subunit having a relatively weak negative optical power; 2) the second lens unit provides axial color correction and has a strong positive optical power; 3) the third lens unit corrects for the field curvature of the lens system and has a relatively strong negative optical power; and 4) the corrector lens unit provides correction for, among other things, aberrations due to off-axis rays and has a relatively weak negative optical power.

The first lens unit serves to correct aperture type aberrations including spherical aberration and coma. As discussed above, this unit includes two subunits, each of which can be composed of one or more lens elements. In the figures, the first and second subunits each consists of a single lens element. Preferably, each subunit includes at least one aspherical surface and the elements of the subunit are preferably composed of a plastic material.

The second lens unit preferably provides the majority of the lens system's positive optical power. This unit preferably includes four lens elements, namely, a negative first lens element composed of glass, a positive second lens element composed of glass, a positive third lens element composed of glass, and a fourth lens element which comprises at least one aspherical surface. The negative and positive elements of this unit have appropriate optical dispersions and powers to provide axial color correction for the lens system.

The corrector unit and third lens unit serve to correct off-axis aperture dependent aberrations and field dependent aberrations, respectively. In particular, the corrector unit is effective in dealing with oblique spherical aberrations, while the third lens unit is effective in reducing the system's field curvature. The corrector unit preferably comprises a single aspherical lens element composed of plastic, while the third lens unit is composed of an aspherical plastic lens element which contacts the fluid which couples the lens system to the faceplate of the CRT. If desired, the aspherical plastic lens element of the third lens unit can include an absorptive color filter material in accordance with Wessling, U.S. Pat. No. 5,055,922. The ratio of the absolute value of the optical power of the corrector lens unit to the overall optical power of the projection lens is preferably less than 0.5, and the ratio of the absolute value of the optical power of the third lens unit to the overall optical power of the projection lens is preferably greater than 0.7.

Focusing of the lens system is preferably achieved by varying the space between the corrector lens unit and the third lens unit. In some cases, e.g., to achieve a wider range of screen diagonals, the space between the first and second subunits of the first lens unit can also be used for focusing in combination with the space between the corrector lens unit and the third lens unit.

Figure 2:
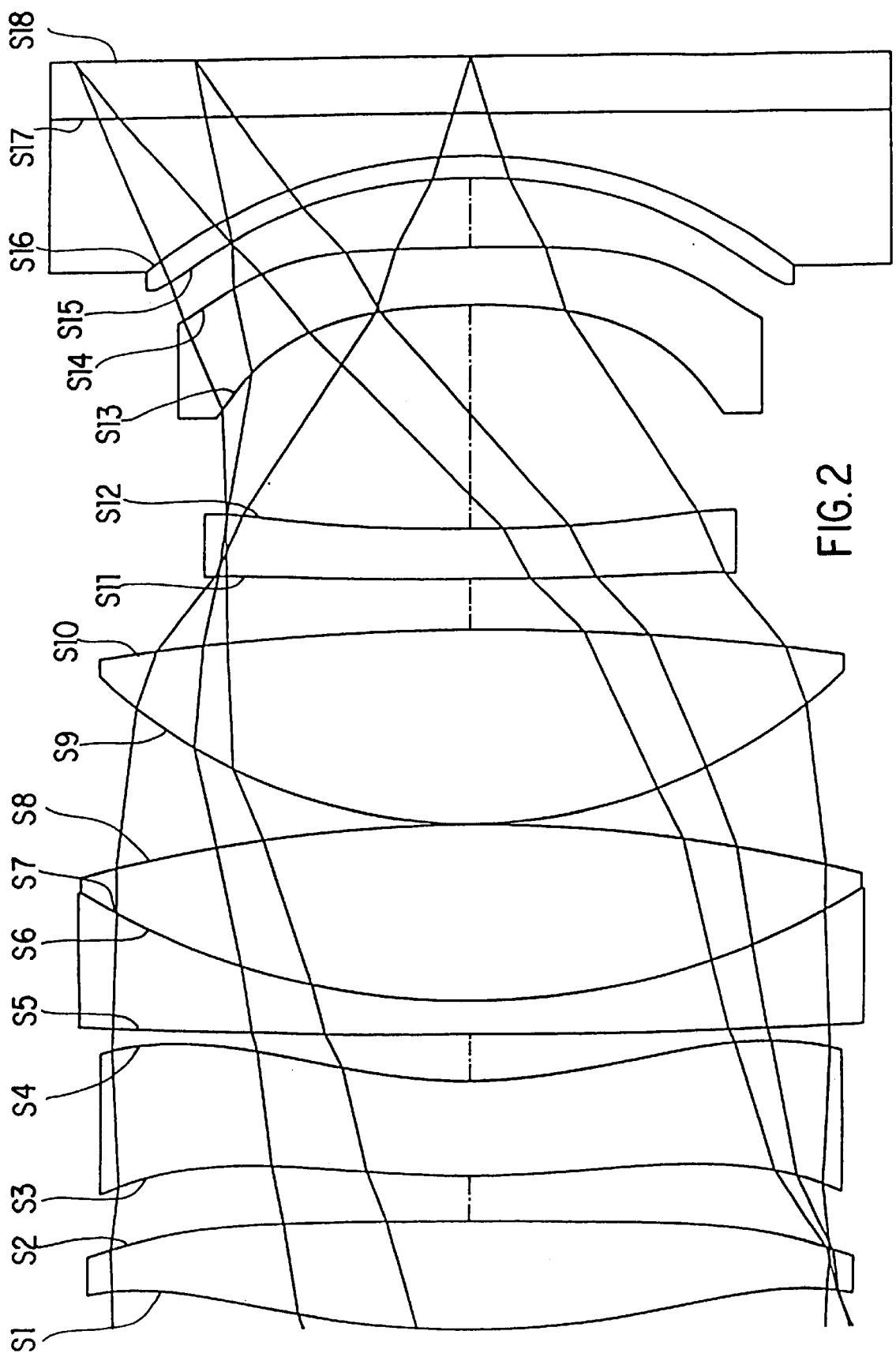
Figure 3:
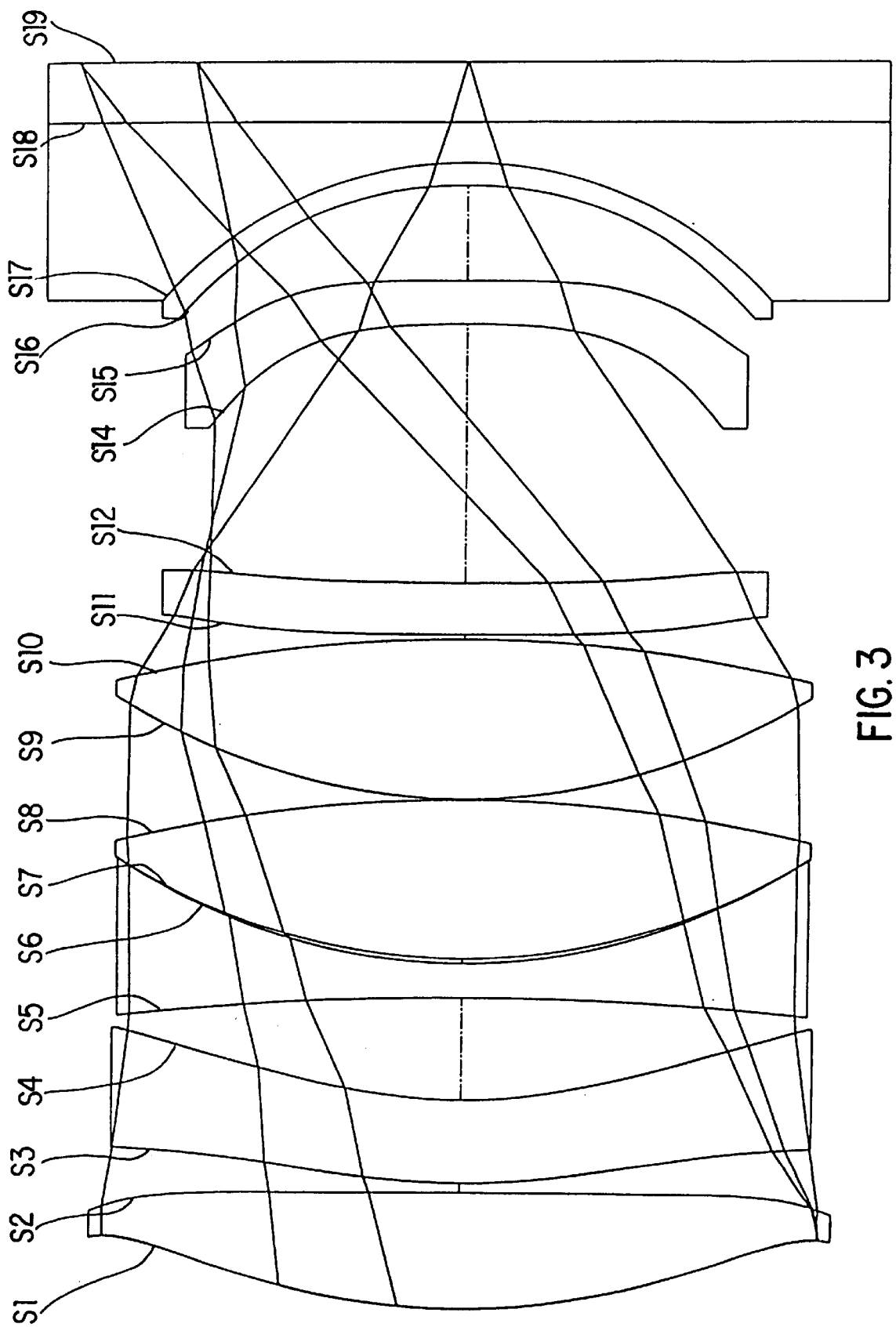

FIGS. 1A, 2, and 3 illustrate various projection lenses constructed in accordance with the invention. Corresponding prescriptions and optical properties appear in Tables 1, 2, and 3A–E, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1, 2, and 3A–E.

The abbreviations used in the tables are as follows:

| | |
|---|---|
| EFL | effective focal length |
| FVD | front vertex distance |
| f/ | f-number |
| ENP | entrance pupil as seen from the long conjugate |
| EXP | exit pupil as seen from the long conjugate |
| BRL | barrel length |
| OBJ HT | object height |
| MAG | magnification |
| STOP | location of aperture stop |
| IMD | image distance |
| OBD | object distance |
| OVL | overall length. |

The designation "a" associated with various surfaces in the tables represents an aspheric surface, i.e., a surface for which at least one of D, E, F, G, H, or I in the above equation is not zero. The designation "c" represents a conic surface, i.e., a surface for which k in the above equation is not zero. All dimensions given in the tables are in millimeters. The tables are constructed on the assumption that light travels from left to right in the figures. In actual practice, the viewing screen will be on the left and the CRT will be on the right, and light will travel from right to left.

The CRT faceplate constitutes surfaces S17–S18 in FIGS. 1 and 2, and constitutes surfaces S18–S19 in FIG. 3. The coupling fluid is located between surfaces S16 and S17 in FIGS. 1 and 2, and between surfaces S17 and S18 in FIG. 3. The material designations 432550 and 539590 set forth in the tables represent the index of refraction and dispersion characteristics of the coupling fluid and the CRT faceplate, respectively. Specifically a $N_e$ value for the material is obtained by adding 1,000 to the first three digits of the designation, and a $V_e$ value is obtained from the last three digits by placing a decimal point before the last digit. Surface S13 in Tables 3A–E is a vignetting surface.

In Tables 1 and 2, the first lens unit comprises surfaces 1–4, the second lens unit comprises surfaces 5–12, the corrector lens unit comprises surfaces 13–14, and the third lens unit comprises surfaces 15–18. In Tables 3A–E, the first lens unit comprises surfaces 1–4, the second lens unit comprises surfaces 5–12, the corrector lens unit comprises surfaces 14–15, and the third lens unit comprises surfaces 16–19. The first and second subunits of the first lens unit comprises surfaces 1–2 and 3–4, respectively, in all the tables.

Figure 1B:
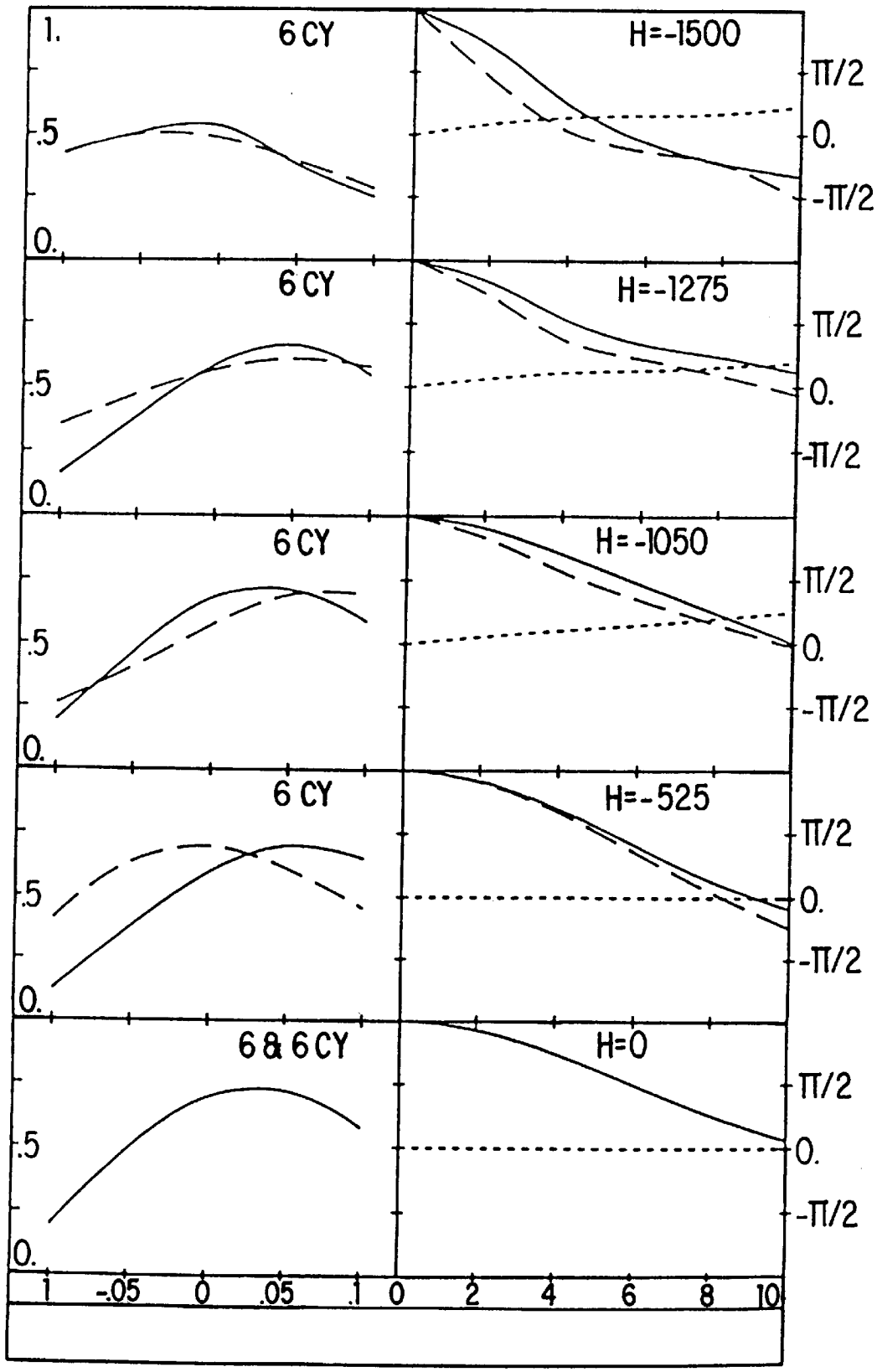
FIGS. 1B, 1C, and 1D are MTF plots (monochromatic optical transfer function plots) for the lens system of FIG. 1A for screen diagonals of 3.0 meters, 1.84 meters, and 7.4 meters, respectively, with the left panel showing through focus data and the right panel showing at focus versus frequency data for a wavelength of 546 nanometers, where dotted lines represent PHASE data, dashed lines represent SAG data, and solid lines represent TAN data. The parameters for FIGS. 1B, 1C, and 1D, including the at focus positions for the right panels, are set forth in Table 6.
Figure 1C:
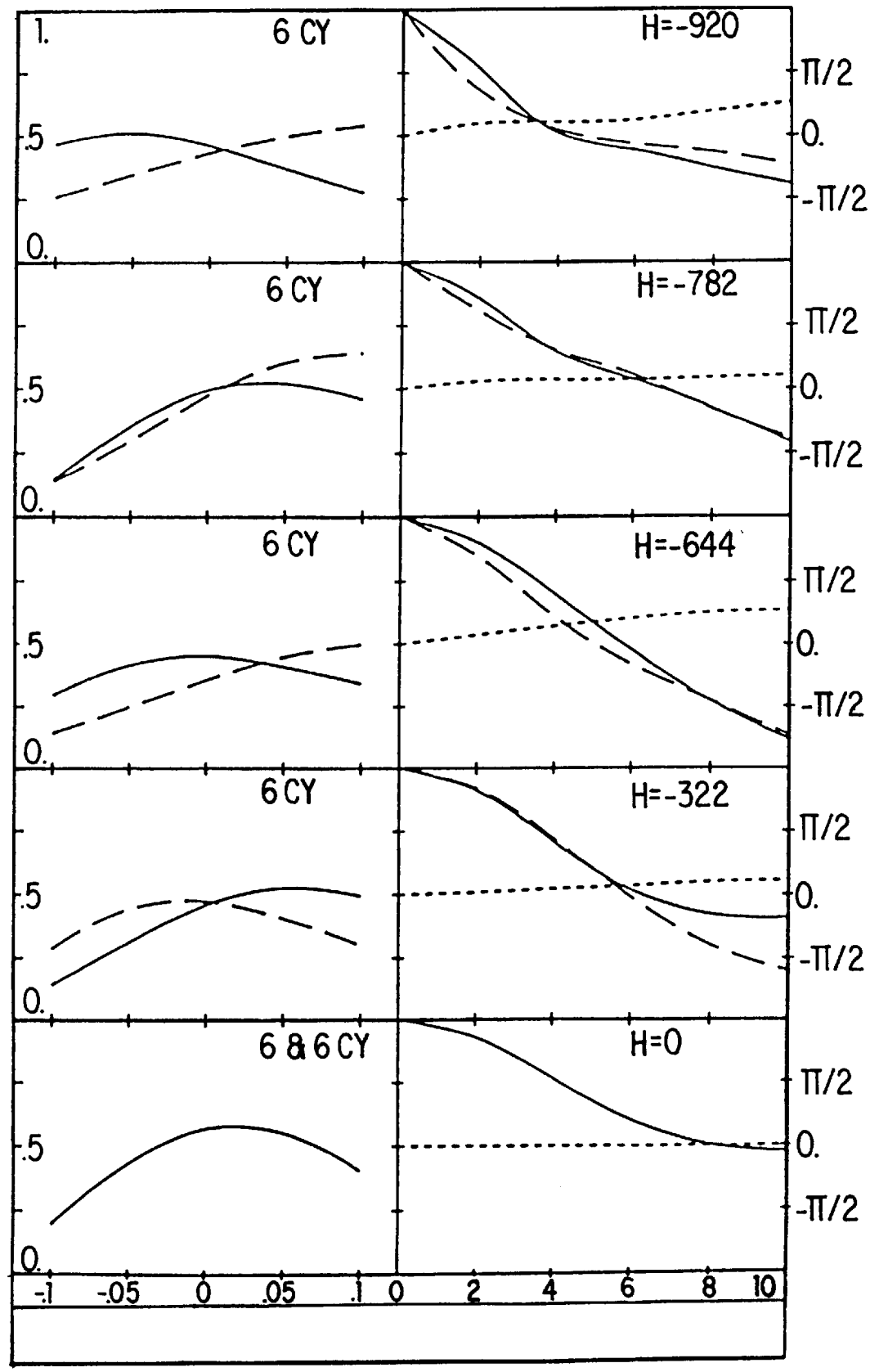
Figure 1D:
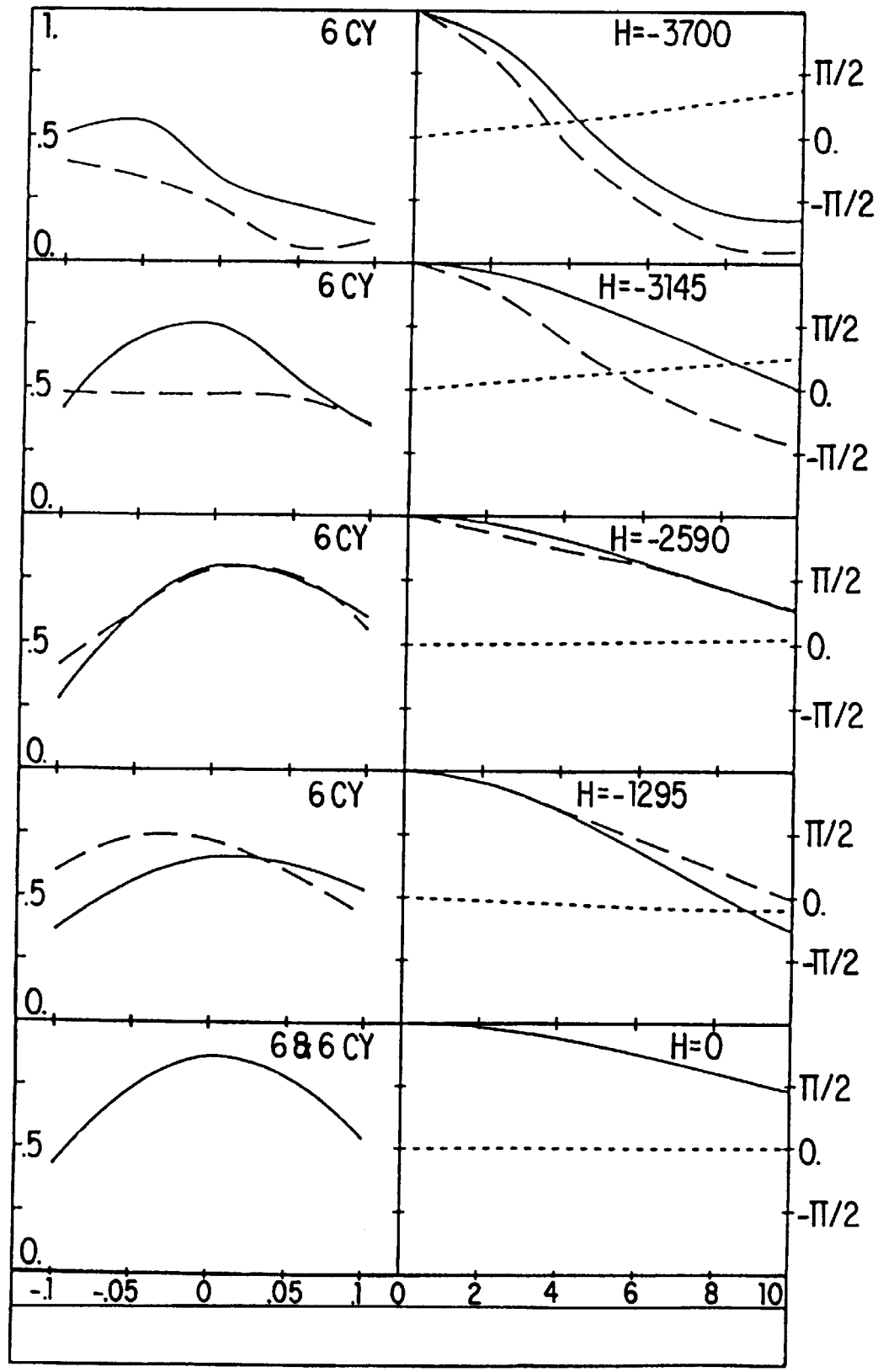

FIGS. 1B–D show representative MTF plots for the lens system of Table 1 (FIG. 1A) for a range of screen diagonals. Similar plots are obtained for the lens systems of Table 2 (FIG. 2) and Tables 3A–E (FIG. 3). Plots of this type can be used to determine the $R_{Min/Max}$ values referred to above and in the claims.

The plots of FIGS. 1B–D show the through-focus MTF on the left and the MTF at best axial focus on the right. The data are shown for five field points, viz., the axis, 0.35 H, 0.70 H, 0.85 H and 1.0 H, where H is the maximum height on the CRT. The actual field heights at the viewing screen are shown for the right hand plots. These field heights apply to both the right hand and left hand plots and are in millimeters.

The through-focus data are at the indicated spatial frequency in cycles per millimeter. Both the through-focus and best-focus data indicate tangential and sagittal (dashed curves) MTF. The modulus scale is on the left of each block and runs from zero to one. The phase of the MTF is shown as a dotted curve in the best-focus plots. The scale for the phase is indicated on the right of each best-focus block and is in radian measure. All the MTF data are for a wavelength of 546.1 nanometers. The axial focus shift indicated in Table 6 for the best-focus plots is relative to the zero position of the through-focus plots. The best-focus plane is at the peak of the axial through-focus plot.

The lens systems of Tables 1, 2, and 3A–E were designed by identifying candidate lens structures which had reasonable performance characteristics over a range of conjugates and by then performing simultaneous optimization of the lens prescription at selected conjugates over the conjugate range of interest to achieve the desired level of performance at those selected conjugates. The same procedure can be used to design lens systems having structures other than those specifically discussed herein.

Figure 4:
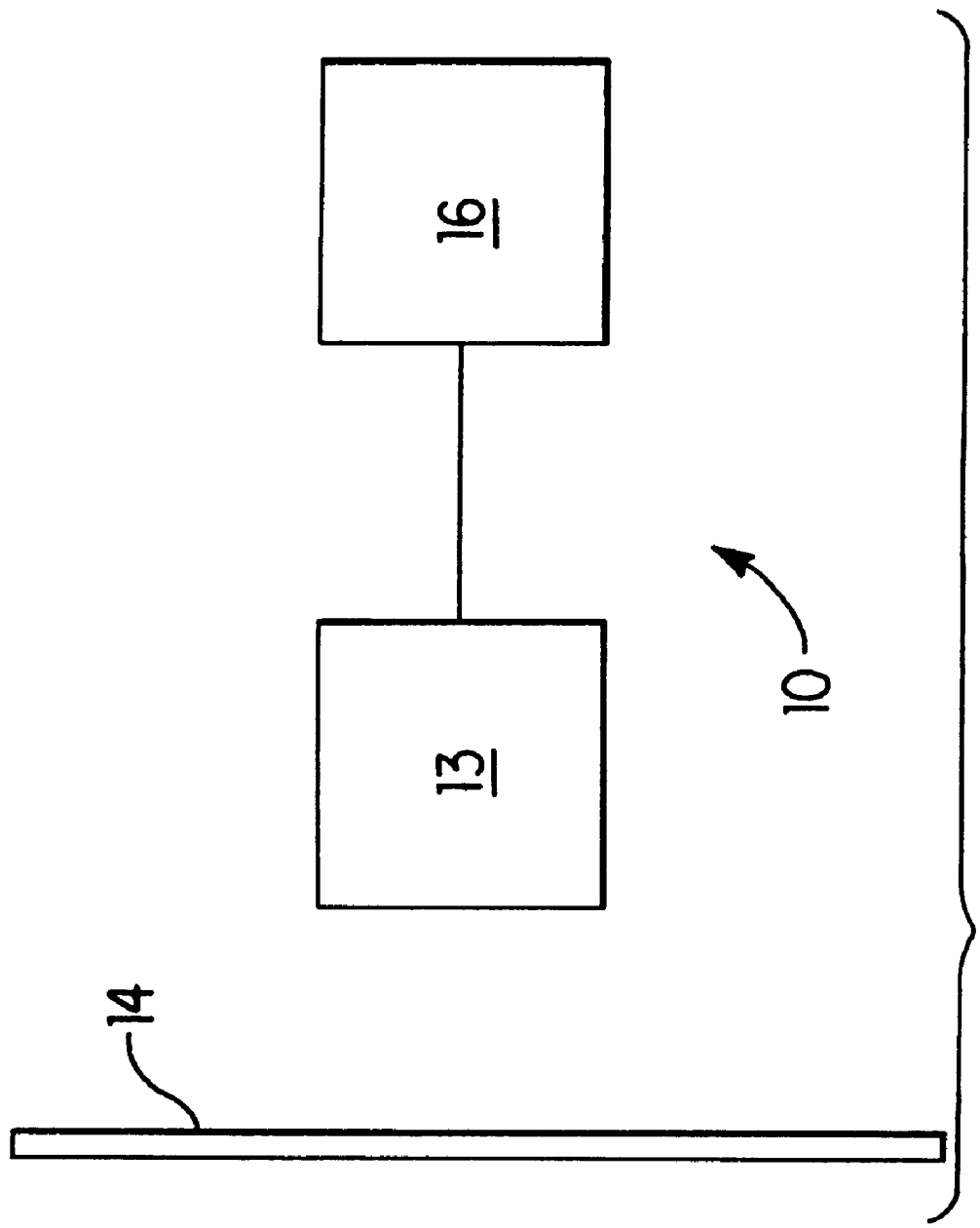
FIG. 4 is a schematic diagram of a front projection TV employing a lens system constructed in accordance with the invention.

FIG. 4 is a schematic diagram of a front projection television 10 constructed in accordance with the invention. In this figure, module 13 schematically illustrates a lens system constructed in accordance with the invention and module 16 schematically illustrates its associated CRT tube. In practice, three lens systems 13 and three CRT tubes 16 are used to project red, green, and blue images onto screen 14.

Tables 4 and 5 summarize various properties of the lens systems of the invention. As shown therein, the lens systems of Tables 1, 2, and 3A–E have the various structural and performance properties referred to above and in the claims.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 151.4728 | 20.00000 | ACRYLIC | 135.19 |
| 2 | a | −1697.8961 | Space 1 | | 131.77 |
| 3 | a | 169.4013 | 16.00000 | ACRYLIC | 128.34 |
| 4 | a | 87.2097 | 9.22000 | | 130.77 |
| 5 | | 1513.0971 | 5.89000 | FD14 | 130.65 |
| 6 | | 124.2907 | 0.05500 | | 129.50 |
| 7 | | 124.5930 | 31.10000 | BACD5 | 129.50 |
| 8 | | −251.5435 | 0.20000 | | 129.76 |
| 9 | | 91.3454 | 33.37000 | BACD5 | 123.34 |
| 10 | | −434.5025 | 5.30000 | | 119.43 |
| 11 | a | −6175.9380 | 13.43000 | ACRYLIC | 100.59 |
| 12 | a | 655.8596 | 39.76000 | | 86.35 |
| 13 | a | −152.2659 | 8.00000 | ACRYLIC | 86.20 |
| 14 | a | −25432.3389 | Space 2 | | 97.78 |
| 15 | a | −104.6496 | 4.00000 | ACRYLIC | 104.57 |
| 16 | | −88.0000 | 7.48000 | 432550 | 107.49 |
| 17 | | ∞ | 10.30000 | 539590 | 128.00 |
| 18 | | ∞ | Image distance | | 138.00 |

Symbol Description a - Polynomial asphere

Even Polynomial Aspheres

| Surf. No. | D | E | F | G | H | I |
|---|---|---|---|---|---|---|
| 1 | −4.9873E − 08 | −5.5387E − 11 | 1.0693E − 15 | −8.7256E − 19 | −2.5226E − 22 | 7.1829E − 26 |
| 2 | 1.0781E − 07 | −7.2550E − 11 | 1.9791E − 16 | 6.1396E − 19 | −1.2640E − 22 | 3.2361E − 26 |
| 3 | −1.1549E − 06 | 1.0513E − 10 | −1.0901E − 14 | 1.0975E − 18 | 3.0961E − 22 | −7.7844E − 26 |
| 4 | −1.6679E − 06 | 1.4557E − 10 | 2.2439E − 15 | −5.5246E − 18 | 8.5620E − 22 | −6.1465E − 26 |
| 11 | 5.9606E − 07 | −1.4945E − 11 | 5.4336E − 14 | −2.5931E − 17 | 6.0005E − 21 | −9.4892E − 25 |
| 12 | 8.4395E − 07 | −1.0253E − 11 | −9.9740E − 14 | 6.5104E − 17 | −2.6480E − 20 | 7.5907E − 25 |
| 13 | −3.6755E − 06 | 1.1736E − 11 | 2.2425E − 13 | −2.6703E − 16 | −4.1654E − 21 | 3.2881E − 23 |
| 14 | −3.3981E − 06 | 5.0606E − 10 | 4.2038E − 15 | −2.0290E − 16 | 9.2628E − 20 | −7.5753E − 24 |
| 15 | −1.7708E − 06 | 1.5462E − 09 | −1.1338E − 12 | 4.6664E − 16 | −9.7894E − 20 | 9.2391E − 24 |

Variable Spaces

| Focus Pos. | Space 1 T (2) | Space 2 T (14) | Focal Shift | Image Distance |
|---|---|---|---|---|
| 1 | 9.598 | 15.483 | −0.873 | −0.005 |
| 2 | 8.373 | 12.437 | −0.643 | 0.006 |
| 3 | 7.047 | 9.599 | −0.438 | 0.002 |

SYSTEM FIRST ORDER PROPERTIES, POS 1

| | | | | | |
|---|---|---|---|---|---|
| OBJ. HT: | −920.00 | f/ | 1.14 | MAG: | −0.0730 |
| STOP: | 21.77 after surface 7. | DIA: | 128.95 | | |
| EFL: | 133.446 | FVD: | 229.181 | ENP: | 75.7495 |
| IMD: | −0.528020E − 02 | BRL: | 229.186 | EXP: | −78.2775 |
| OBD: | −2008.86 | OVL: | 2238.04 | | |

SYSTEM FIRST ORDER PROPERTIES, POS 2

| | | | | | |
|---|---|---|---|---|---|
| OBJ. HT: | −1500.0 | f/ | 1.10 | MAG: | −0.0445 |
| STOP: | 21.77 after surface 7. | DIA: | 129.69 | | |
| EFL: | 134.930 | FVD: | 224.922 | ENP: | 73.8016 |
| IMD: | 0.645208E − 02 | BRL: | 224.915 | EXP: | −76.5637 |
| OBD: | −3214.00 | OVL: | 3438.92 | | |

SYSTEM FIRST ORDER PROPERTIES, POS 3

| | | | | | |
|---|---|---|---|---|---|
| OBJ. HT: | −3700.0 | f/ | 1.07 | MAG: | −0.0175 |
| STOP: | 21.77 after surface 7. | DIA: | 129.11 | | |
| EFL: | 136.320 | FVD: | 220.753 | ENP: | 71.7174 |
| IMD: | 0.208989E − 02 | BRL: | 220.751 | EXP: | −74.9383 |
| OBD: | −7972.56 | OVL: | 8193.31 | | |

First Order Properties of Elements

| Element Number | Surface Numbers | | Power | f' |
|---|---|---|---|---|
| 1 | 1 | 2 | 0.35380E − 02 | 282.65 |
| 2 | 3 | 4 | −0.25703E − 02 | −389.05 |
| 3 | 5 | 6 | −0.56654E − 02 | −176.51 |

TABLE 1-continued

| | | | | |
|---|---|---|---|---|
| 4 | 7 | 8 | 0.68799E − 02 | 145.35 |
| 5 | 9 | 10 | 0.76509E − 02 | 130.70 |
| 6 | 11 | 12 | −0.83336E − 03 | −1200.0 |
| 7 | 13 | 14 | −0.32231E − 02 | −310.26 |
| 8 | 15 | 16 | 0.96361E − 03 | 1037.8 |
| 9 | 16 | 17 | −0.49091E − 02 | −203.70 |

TABLE 2

| Surf. No. | Type | Radius | Thickness | Glass | Clear Aperture Diameter |
|---|---|---|---|---|---|
| 1 | a | 151.2999 | 20.00000 | ACRYLIC | 127.41 |
| 2 | a | −1470.8759 | Space 1 | | 124.66 |
| 3 | a | 176.0888 | 16.00000 | ACRYLIC | 120.74 |
| 4 | a | 88.2040 | 8.00000 | | 123.16 |
| 5 | | 1513.0971 | 5.89000 | FD14 | 130.70 |
| 6 | | 124.2907 | 0.05500 | | 129.50 |
| 7 | | 124.6100 | 31.10000 | BACD5 | 129.50 |
| 8 | | −251.5435 | 0.20000 | | 123.80 |
| 9 | | 91.3454 | 33.37000 | BACD5 | 123.40 |
| 10 | | −434.5025 | 8.79000 | | 119.50 |
| 11 | a | 1284.7020 | 8.80000 | ACRYLIC | 89.02 |
| 12 | a | 387.3041 | 38.72000 | | 83.64 |
| 13 | a | −144.7297 | 10.10000 | ACRYLIC | 84.91 |
| 14 | a | −3604.0411 | Space 2 | | 97.93 |
| 15 | a | −104.6496 | 4.00000 | ACRYLIC | 104.60 |
| 16 | | −88.0000 | 7.48000 | 432550 | 107.50 |
| 17 | | ∞ | 10.30000 | 539590 | 128.00 |
| 18 | | ∞ | Image distance | | 140.00 |

Symbol Description a - Polynomial asphere

Even Polynomial Aspheres

| Surf. No. | D | E | F | G | H | I |
|---|---|---|---|---|---|---|
| 1 | −1.2383E − 07 | −7.3566E − 11 | −1.1297E − 15 | −1.2815E − 18 | −6.0722E − 23 | 6.8198E − 26 |
| 2 | −4.3400E − 09 | −9.1021E − 11 | 1.4173E − 15 | 1.1015E − 18 | −1.8614E − 22 | 3.1598E − 26 |
| 3 | −1.2598E − 06 | 1.1729E − 10 | −8.9211E − 15 | 8.1323E − 19 | 8.7118E − 23 | −6.6213E − 26 |
| 4 | −1.7888E − 06 | 1.6828E − 10 | −2.4113E − 15 | −6.7715E − 18 | 1.2061E − 21 | −8.2044E − 26 |
| 11 | 4.3378E − 07 | −2.2939E − 10 | 2.5757E − 14 | −2.6463E − 17 | 1.4467E − 20 | −3.3247E − 24 |
| 12 | 7.1797E − 07 | −1.4005E − 10 | −1.7508E − 13 | 1.3575E − 16 | −6.5255E − 20 | 9.3449E − 24 |
| 13 | −2.7640E − 06 | −6.0873E − 10 | 4.9020E − 13 | −1.8613E − 16 | −1.4151E − 19 | 7.1512E − 23 |
| 14 | −2.4880E − 06 | −1.3751E − 10 | 4.4652E − 13 | −3.7105E − 16 | 1.2365E − 19 | −1.0036E − 23 |
| 15 | −1.7708E − 06 | 1.5462E − 09 | −1.1338E − 12 | 4.6664E − 16 | −9.7894E − 20 | 9.2391E − 24 |

Variable Spaces

| Focus Pos. | Space 1 T (2) | Space 2 T (14) | Focal Shift | Image Distance |
|---|---|---|---|---|
| 1 | 8.666 | 15.152 | −0.630 | 0.007 |
| 2 | 7.538 | 12.082 | −0.420 | 0.007 |
| 3 | 6.295 | 9.157 | −0.292 | 0.006 |

SYSTEM FIRST ORDER PROPERTIES, POS 1

| | | | | | |
|---|---|---|---|---|---|
| OBJ. HT: | −920.00 | f/ | 1.21 | MAG: | −0.0730 |
| STOP: | 21.77 after surface 7. | DIA: | 121.07 | | |
| EFL: | 133.376 | FVD: | 226.630 | ENP: | 72.4610 |
| IMD: | 0.724524E − 02 | BRL: | 226.623 | EXP: | −78.4736 |
| OBD: | −2011.04 | OVL: | 2237.67 | | |

SYSTEM FIRST ORDER PROPERTIES, POS 2

| | | | | | |
|---|---|---|---|---|---|
| OBJ. HT: | −1500.0 | f/ | 1.17 | MAG: | −0.0445 |
| STOP: | 21.77 after surface 7. | DIA: | 121.42 | | |
| EFL: | 134.896 | FVD: | 222.432 | ENP: | 70.6922 |
| IMD: | 0.665385E − 02 | BRL: | 222.425 | EXP: | −76.7499 |
| OBD: | −3216.36 | OVL: | 3438.79 | | |

SYSTEM FIRST ORDER PROPERTIES, POS 3

| | | | | | |
|---|---|---|---|---|---|
| OBJ. HT: | −3700.0 | f/ | 1.14 | MAG: | −0.0175 |

TABLE 2-continued

| STOP: | 21.77 after surface 7. | DIA: | 120.66 | | |
|---|---|---|---|---|---|
| EFL: | 136.358 | FVD: | 218.263 | ENP: | 68.7641 |
| IMD: | 0.638184E − 02 | BRL: | 218.257 | EXP: | −75.0774 |
| OBD: | −7977.86 | OVL: | 8196.12 | | |

First Order Properties of Elements

| Element Number | Surface Numbers | | Power | f' |
|---|---|---|---|---|
| 1 | 1 | 2 | 0.35846E − 02 | 278.97 |
| 2 | 3 | 4 | −0.26258E − 02 | −380.83 |
| 3 | 5 | 6 | −0.56654E − 02 | −176.51 |
| 4 | 7 | 8 | 0.68793E − 02 | 145.36 |
| 5 | 9 | 10 | 0.76509E − 02 | 130.70 |
| 6 | 11 | 12 | −0.88767E − 03 | −1126.5 |
| 7 | 13 | 14 | −0.32715E − 02 | −305.67 |
| 8 | 15 | 16 | 0.96361E − 03 | 1037.8 |
| 9 | 16 | 17 | −0.49091E − 02 | −203.70 |

TABLE 3A

| Surf. No. | Type | Radius | Thickness | Glass | Clear Aperture Diameter |
|---|---|---|---|---|---|
| 1 | ac | 126.7164 | 20.37000 | ACRYLIC | 125.30 |
| 2 | a | −2252.9261 | Space 1 | | 125.27 |
| 3 | ac | 136.1761 | 14.06000 | ACRYLIC | 121.93 |
| 4 | a | 95.4612 | 17.55240 | | 116.61 |
| 5 | | −570.5465 | 5.89000 | FD1 | 116.30 |
| 6 | | 107.3514 | 0.84986 | | 116.26 |
| 7 | | 112.0741 | 28.00000 | BACD5 | 116.34 |
| 8 | | −247.8398 | 0.20000 | | 117.03 |
| 9 | | 112.0741 | 28.00000 | BACD5 | 116.34 |
| 10 | | −247.8398 | 0.82000 | | 117.10 |
| 11 | ac | 4394.5410 | 9.00000 | ACRYLIC | 101.42 |
| 12 | a | 1589.9900 | 7.34591 | | 95.10 |
| 13 | | 28 | 37.50000 | | 89.44 |
| 14 | a | −217.0705 | 7.50000 | ACRYLIC | 87.65 |
| 15 | ac | −9341.5518 | Space 2 | | 95.95 |
| 16 | a | −73.8501 | 4.00000 | ACRYLIC | 98.37 |
| 17 | | −70.0000 | 7.48000 | 432550 | 102.07 |
| 18 | | ∞ | 10.30000 | 539590 | 130.00 |
| 19 | | ∞ | Image distance | | 142.00 |

Symbol Description a - Polynomial sphere
c - Conic section

Conics

| Surface Number | Constant |
|---|---|
| 1 | −1.0000E + 00 |
| 3 | 1.4000E + 00 |
| 11 | 9.0000E + 01 |
| 15 | −1.2000E + 01 |

Even Polynomial Aspheres

| Surf. No. | D | E | F | G | H | I |
|---|---|---|---|---|---|---|
| 1 | 1.0460E − 07 | −3.5070E − 11 | −2.9197E − 15 | 1.3250E − 18 | −1.1776E − 21 | 8.5692E − 26 |
| 2 | 2.1519E − 07 | −8.0922E − 11 | 2.3426E − 15 | −9.4497E − 19 | 1.9366E − 22 | −5.3061E − 26 |
| 3 | −8.2429E − 07 | 1.8867E − 11 | −1.7902E − 14 | 1.0207E − 17 | −1.3591E − 21 | 2.6542E − 26 |
| 4 | −9.6081E − 07 | 4.9746E − 11 | 3.0592E − 14 | −9.4770E − 18 | 1.1908E − 21 | −1.1959E − 25 |
| 11 | 5.6055E − 07 | −1.7961E − 11 | 1.6771E − 14 | −1.5644E − 17 | 5.7995E − 21 | −1.5444E − 24 |
| 12 | 4.4506E − 07 | 1.5044E − 11 | −5.5971E − 14 | 2.7733E − 17 | −1.1835E − 20 | 8.0704E − 25 |
| 14 | −3.4545E − 06 | −5.9560E − 10 | 8.5736E − 13 | −4.2268E − 16 | 5.4986E − 20 | 1.1607E − 23 |
| 15 | −2.9763E − 06 | −1.1018E − 10 | 2.5077E − 13 | −9.0641E − 18 | −3.5909E − 20 | 1.0994E − 23 |
| 16 | −1.0775E − 06 | 9.4275E − 10 | −1.1670E − 12 | 7.5071E − 16 | −2.3206E − 19 | 2.8308E − 23 |

TABLE 3A-continued

Variable Spaces

| Focus Pos. | Space 1 T (2) | Space 2 T (15) | Focal Shift | Image Distance |
|---|---|---|---|---|
| 1 | 1.926 | 18.305 | −0.629 | 0.002 |
| 2 | 1.582 | 16.812 | −0.428 | 0.000 |
| 3 | 1.093 | 14.682 | −0.175 | −0.003 |

SYSTEM FIRST ORDER PROPERTIES, POS 1

| | | | | | |
|---|---|---|---|---|---|
| OBJ. HT: | −1120.0 | f/ | 1.16 | MAG: | −0.0593 |
| STOP: | 0.00 after surface 5. | DIA: | 115.61 | | |
| EFL: | 132.571 | FVD: | 219.101 | ENP: | 52.9037 |
| IMD: | 0.209713E − 02 | BRL: | 219.099 | EXP: | −80.3490 |
| OBD: | −2423.05 | OVL: | 2642.15 | | |

SYSTEM FIRST ORDER PROPERTIES, POS 2

| | | | | | |
|---|---|---|---|---|---|
| OBJ. HT: | −1500.0 | f/ | 1.14 | MAG: | −0.0442 |
| STOP: | 0.00 after surface 5. | DIA: | 116.01 | | |
| EFL: | 133.736 | FVD: | 217.263 | ENP: | 52.3994 |
| IMD: | 0.433624E-03 | BRL: | 217.263 | EXP: | −79.7687 |
| OBD: | −3214.06 | OVL: | 3431.33 | | |

SYSTEM FIRST ORDER PROPERTIES, POS 3

| | | | | | |
|---|---|---|---|---|---|
| OBJ. HT: | −2880.0 | f/ | 1.12 | MAG: | −0.0229 |
| STOP: | 0.00 after surface 5. | DIA: | 116.20 | | |
| EFL: | 135.439 | FVD: | 214.640 | ENP: | 51.6829 |
| IMD: | −.273645E − 02 | BRL: | 214.643 | EXP: | −78.9296 |
| OBD: | −6104.03 | OVL: | 6318.67 | | |

First Order Properties of Elements

| Element Number | Surface Numbers | | Power | f' |
|---|---|---|---|---|
| 1 | 1 | 2 | 0.40895E − 02 | 244.53 |
| 2 | 3 | 4 | −0.13655E − 02 | −732.34 |
| 3 | 5 | 6 | −0.80324E − 02 | −124.50 |
| 4 | 7 | 8 | 0.74418E − 02 | 134.38 |
| 5 | 9 | 10 | 0.74418E − 02 | 134.38 |
| 6 | 11 | 12 | −0.19727E − 03 | −5069.2 |
| 7 | 14 | 15 | −0.22133E − 02 | −451.82 |
| 8 | 16 | 17 | 0.49404E − 03 | 2024.1 |
| 9 | 17 | 18 | −0.61714E − 02 | −162.04 |

TABLE 3B

| Surf. No. | Type | Radius | Thickness | Glass | Clear Aperture Diameter |
|---|---|---|---|---|---|
| 1 | ac | 128.9734 | 20.97000 | ACRYLIC | 125.28 |
| 2 | a | −1354.5270 | 2.38000 | | 125.30 |
| 3 | ac | 136.1761 | 14.06000 | ACRYLIC | 122.00 |
| 4 | a | 95.4612 | 17.55240 | | 116.70 |
| 5 | | −570.5465 | 5.89000 | FD1 | 116.30 |
| 6 | | 107.3514 | 0.84986 | | 116.30 |
| 7 | | 112.0741 | 28.00000 | BACD5 | 116.40 |
| 8 | | −247.8398 | 0.200000 | | 117.10 |
| 9 | | 112.0741 | 28.00000 | BACD5 | 116.40 |
| 10 | | −247.8398 | 0.82000 | | 117.10 |
| 11 | ac | 4394.5410 | 9.00000 | ACRYLIC | 101.50 |
| 12 | a | 1589.9900 | 7.34591 | | 95.10 |
| 13 | | ∞ | 37.50000 | | 89.50 |
| 14 | a | −199.2794 | 8.23000 | ACRYLIC | 87.70 |
| 15 | ac | −2366.7481 | Space 1 | | 96.00 |
| 16 | a | −73.8501 | 4.00000 | ACRYLIC | 98.40 |
| 17 | | −70.0000 | 7.48000 | 432550 | 102.10 |
| 18 | | ∞ | 10.30000 | 539590 | 130.00 |
| 19 | | ∞ | Image distance | | 142.00 |

TABLE 3B-continued

Symbol Description a - Polynomial asphere
c - Conic section

Conics

| Surface Number | Constant |
|---|---|
| 1 | −1.0000E + 00 |
| 3 | 1.4000E + 00 |
| 11 | 9.0000E + 01 |
| 15 | −1.2000E + 01 |

Even Polynomial Aspheres

| Surf. No. | D | E | F | G | H | I |
|---|---|---|---|---|---|---|
| 1 | 8.9060E − 08 | −3.2668E − 11 | −4.7098E − 15 | 1.1697E − 18 | −1.0821E − 21 | 8.2049E − 26 |
| 2 | 2.0485E − 07 | −7.8606E − 11 | 7.6762E − 16 | −1.1476E − 18 | 3.0283E − 22 | −5.9670E − 26 |
| 3 | −8.2429E − 07 | 1.8867E − 11 | −1.7902E − 14 | 1.0207E − 17 | −1.3591E − 21 | 2.6542E − 26 |
| 4 | −9.6081E − 07 | 4.9746E − 11 | 3.0592E − 14 | −9.4770E − 18 | 1.1908E − 21 | −1.1959E − 25 |
| 11 | 5.6055E − 07 | −1.7961E − 11 | 1.6771E − 14 | −1.5644E − 17 | 5.7995E − 21 | −1.5444E − 24 |
| 12 | 4.4506E − 07 | 1.5044E − 11 | −5.5971E − 14 | 2.7733E − 17 | −1.1835E − 20 | 8.0704E − 25 |
| 14 | −3.2974E − 06 | −3.6947E − 10 | 6.3662E − 13 | −4.1618E − 16 | 1.0864E − 19 | −3.9910E − 24 |
| 15 | −2.7996E − 06 | 6.7660E − 11 | 5.4756E − 14 | 1.9549E − 17 | −2.6809E − 20 | 7.8795E − 24 |
| 16 | −1.0775E − 06 | 9.4275E − 10 | −1.1670E − 12 | 7.5071E − 16 | −2.3206E − 19 | 2.8308E − 23 |

Variable Spaces

| Focus Pos. | Space 1 T (15) | Focal Shift | Image Distance |
|---|---|---|---|
| 1 | 19.853 | −0.533 | 0.004 |
| 2 | 18.522 | −0.336 | 0.001 |
| 3 | 16.870 | −0.100 | 0.002 |

SYSTEM FIRST ORDER PROPERTIES, POS 1

| | | | | | |
|---|---|---|---|---|---|
| OBJ. HT: | −762.00 | f/ | 1.19 | MAG: | −0.0860 |
| STOP: | 0.00 after surface 5. | DIA: | 114.86 | | |
| EFL: | 129.695 | FVD: | 222.435 | ENP: | 54.1630 |
| IMD: | 0.370836E − 02 | BRL: | 222.431 | EXP: | −81.0678 |
| OBD: | −1692.68 | OVL: | 1915.11 | | |

SYSTEM FIRST ORDER PROPERTIES, POS 2

| | | | | | |
|---|---|---|---|---|---|
| OBJ. HT: | −889.00 | f/ | 1.18 | MAG: | −0.0730 |
| STOP: | 0.00 after surface 5. | DIA: | 114.26 | | |
| EFL: | 130.727 | FVD: | 221.101 | ENP: | 54.1630 |
| IMD: | 0.771195E − 03 | BRL: | 221.100 | EXP: | −80.5577 |
| OBD: | −1976.14 | OVL: | 2197.24 | | |

SYSTEM FIRST ORDER PROPERTIES, POS 3

| | | | | | |
|---|---|---|---|---|---|
| OBJ. HT: | −1145.0 | f/ | 1.17 | MAG: | −0.0570 |
| STOP: | 0.00 after surface 5. | DIA: | 113.23 | | |
| EFL: | 130.032 | FVD: | 219.450 | ENP: | 54.1630 |
| IMD: | 0.171453E − 02 | BRL: | 219.448 | EXP: | −79.9176 |
| OBD: | −2502.66 | OVL: | 2722.11 | | |

First Order Properties of Elements

| Element Number | Surface Numbers | | Power | f' |
|---|---|---|---|---|
| 1 | 1 | 2 | 0.41585E − 02 | 240.47 |
| 2 | 3 | 4 | −0.13655E − 02 | −732.34 |
| 3 | 5 | 6 | −0.80324E − 02 | −124.50 |
| 4 | 7 | 8 | 0.74418E − 02 | 134.38 |
| 5 | 9 | 10 | 0.74418E − 02 | 134.38 |
| 6 | 11 | 12 | −0.19727E − 03 | −5069.2 |
| 7 | 14 | 15 | −0.22582E − 02 | −442.83 |
| 8 | 16 | 17 | 0.49404E − 03 | 2024.1 |
| 9 | 17 | 18 | −0.61714E − 02 | −162.04 |

TABLE 3C

| Surf. No. | Type | Radius | Thickness | Glass | Clear Aperture Diameter |
|---|---|---|---|---|---|
| 1 | ac | 124.3954 | 20.97000 | ACRYLIC | 124.95 |
| 2 | a | −2522.3970 | 0.97000 | | 124.01 |
| 3 | ac | 136.1761 | 14.06000 | ACRYLIC | 122.00 |
| 4 | a | 95.4612 | 16.59000 | | 116.70 |
| 5 | | −570.5465 | 5.89000 | FD1 | 116.30 |
| 6 | | 107.3514 | 0.84986 | | 116.30 |
| 7 | | 112.0741 | 28.00000 | BACD5 | 116.40 |
| 8 | | −247.8398 | 0.20000 | | 117.10 |
| 9 | | 112.0741 | 28.00000 | BACD5 | 116.40 |
| 10 | | −247.8398 | 0.82000 | | 117.10 |
| 11 | ac | 4394.5410 | 9.00000 | ACRYLIC | 101.50 |
| 12 | a | 1589.9900 | 7.34591 | | 95.10 |
| 13 | | ∞ | 37.50000 | | 89.50 |
| 14 | a | −199.2794 | 8.23000 | ACRYLIC | 87.70 |
| 15 | ac | −2366.7481 | Space 1 | | 96.00 |
| 16 | a | −73.8501 | 4.00000 | ACRYLIC | 98.40 |
| 17 | | −70.0000 | 7.48000 | 432550 | 102.10 |
| 18 | | ∞ | 10.30000 | 539590 | 130.00 |
| 19 | | ∞ | Image distance | | 142.00 |

Symbol Description a - Polynomial asphere
c - Conic section

Conics

| Surface Number | Constant |
|---|---|
| 1 | −1.0000E + 00 |
| 3 | 1.4000E + 00 |
| 11 | 9.0000E + 01 |
| 15 | −1.2000E + 01 |

Even Polynomial Aspheres

| Surf. No. | D | E | F | G | H | I |
|---|---|---|---|---|---|---|
| 1 | 1.0119E − 07 | −3.5184E − 11 | −1.2054E − 15 | 1.8548E − 19 | −9.1683E − 22 | 6.1595E − 26 |
| 2 | 2.1323E − 07 | −7.2674E − 11 | −6.3369E − 15 | 2.6152E − 18 | −5.0679E − 22 | −1.0805E − 27 |
| 3 | −8.2429E − 07 | 1.8867E − 11 | −1.7902E − 14 | 1.0207E − 17 | −1.3591E − 21 | 2.6542E − 26 |
| 4 | −9.6081E − 07 | 4.9746E − 11 | 3.0592E − 14 | −9.4770E − 18 | 1.1908E − 21 | −1.1959E − 25 |
| 11 | 5.6055E − 07 | −1.7961E − 11 | 1.6771E − 14 | −1.5644E − 17 | 5.7995E − 21 | −1.5444E − 24 |
| 12 | 4.4506E − 07 | 1.5044E − 11 | −5.5971E − 14 | 2.7733E − 17 | −1.1835E − 20 | 8.0704E − 25 |
| 14 | −3.2974E − 06 | −3.6947E − 10 | 6.3662E − 13 | −4.1618E − 16 | 1.0864E − 19 | −3.9910E − 24 |
| 15 | −2.7996E − 06 | 6.7660E − 11 | 9.4756E − 14 | 1.9549E − 17 | −2.6809E − 20 | 7.8795E − 24 |
| 16 | −1.0775E − 06 | 9.4275E − 10 | −1.1670E − 12 | 7.5071E − 16 | −2.3206E − 19 | 2.8308E − 23 |

Variable Spaces

| Focus Pos. | Space 1 T (15) | Focal Shift | Image Distance |
|---|---|---|---|
| 1 | 17.430 | −0.500 | −0.008 |
| 2 | 14.970 | −0.120 | 0.004 |

SYSTEM FIRST ORDER PROPERTIES, POS 1

| | | | | | |
|---|---|---|---|---|---|
| OBJ. HT: | −1110.0 | F/ | 1.16 | MAG: | −0.0590 |
| STOP: | 0.00 after surface 5. | DIA: | 115.06 | | |
| EFL: | 131.763 | FVD: | 217.627 | ENP: | 50.8106 |
| IMD: | −.833607E − 02 | BRL: | 217.636 | EXP: | −80.1355 |
| OBD: | −2420.77 | OVL: | 2638.39 | | |

SYSTEM FIRST ORDER PROPERTIES, POS 2

| | | | | | |
|---|---|---|---|---|---|
| OBJ. HT: | −1860.0 | f/ | 1.14 | MAG: | −0.0350 |
| STOP: | 0.00 after surface 5. | DIA: | 114.77 | | |
| EFL: | 133.752 | FVD: | 215.180 | ENP: | 50.8106 |
| IMD: | 0.449809E − 02 | BRL: | 215.176 | EXP: | −79.1719 |
| OBD: | −4010.45 | OVL: | 4225.63 | | |

TABLE 3C-continued

First Order Properties of Elements

| Element Number | Surface Numbers | | Power | f' |
|---|---|---|---|---|
| 1 | 1 | 2 | 0.41393E − 02 | 241.58 |
| 2 | 3 | 4 | −0.13655E − 02 | −732.34 |
| 3 | 5 | 6 | −0.80324E − 02 | −124.50 |
| 4 | 7 | 8 | 0.74418E − 02 | 134.38 |
| 5 | 9 | 10 | 0.74418E − 02 | 134.38 |
| 6 | 11 | 12 | −0.19727E − 03 | −5069.2 |
| 7 | 14 | 15 | −0.22582E − 02 | −442.83 |
| 8 | 16 | 17 | 0.49404E − 03 | 2024.1 |
| 9 | 17 | 18 | −0.61714E − 02 | −162.04 |

TABLE 3D

| Surf. No. | Type | Radius | Thickness | Glass | Clear Aperture Diameter |
|---|---|---|---|---|---|
| 1 | ac | 124.3954 | 20.97000 | ACRYLIC | 125.00 |
| 2 | a | −2305.1919 | Space 1 | | 119.40 |
| 3 | ac | 136.1761 | 14.06000 | ACRYLIC | 122.00 |
| 4 | a | 95.4612 | 16.59000 | | 116.70 |
| 5 | | −570.5465 | 5.89000 | FD1 | 116.30 |
| 6 | | 107.3514 | 0.84986 | | 116.30 |
| 7 | | 112.0741 | 28.00000 | BACD5 | 116.40 |
| 8 | | −247.8398 | 0.20000 | | 117.10 |
| 9 | | 112.0741 | 28.00000 | BACD5 | 116.40 |
| 10 | | −247.8398 | 0.82000 | | 117.10 |
| 11 | ac | 4394.5410 | 9.00000 | ACRYLIC | 101.50 |
| 12 | a | 1589.9900 | 7.34591 | | 95.10 |
| 13 | | ∞ | 37.50000 | | 89.50 |
| 14 | a | −199.2794 | 8.23000 | ACRYLIC | 87.70 |
| 15 | ac | −2366.7481 | Space 2 | | 96.00 |
| 16 | a | −73.8501 | 4.00000 | ACRYLIC | 98.40 |
| 17 | | −70.0000 | 7.48000 | 432550 | 102.10 |
| 18 | | ∞ | 10.30000 | 539590 | 130.00 |
| 19 | | ∞ | Image distance | | 142.00 |

Symbol Description a - Polynomial asphere
c - Conic section

Conics

| Surface Number | Constant |
|---|---|
| 1 | −1.0000E + 00 |
| 3 | 1.4000E + 00 |
| 11 | 9.0000E + 01 |
| 15 | −1.2000E + 01 |

Even Polynomial Aspheres

| Surf. No. | D | E | F | G | H | I |
|---|---|---|---|---|---|---|
| 1 | 1.0119E − 07 | −3.5184E − 11 | −1.2054E − 15 | 1.8548E − 19 | −9.1683E − 22 | 6.1595E − 26 |
| 2 | 2.1258E − 07 | −7.1908E − 11 | −6.7969E − 15 | 2.6263E − 18 | −4.8371E − 22 | −2.4715E − 27 |
| 3 | −8.2429E − 07 | 1.8867E − 11 | −1.7902E − 14 | 1.0207E − 17 | −1.3591E − 21 | 2.6542E − 26 |
| 4 | −9.6081E − 07 | 4.9746E − 11 | 3.0592E − 14 | −9.4770E − 18 | 1.1908E − 21 | −1.1959E − 25 |
| 11 | 5.6055E − 07 | −1.7961E − 11 | 1.6771E − 14 | −1.5644E − 17 | 5.7995E − 21 | −1.5444E − 24 |
| 12 | 4.4506E − 07 | 1.5044E − 11 | −5.5971E − 14 | 2.7733E − 17 | −1.1835E − 20 | 8.0704E − 25 |
| 14 | −3.2974E − 06 | −3.6947E − 10 | 6.3662E − 13 | −4.1618E − 16 | 1.0864E − 19 | −3.9910E − 24 |
| 15 | −2.7996E − 06 | 6.7660E − 11 | 9.4756E − 14 | 1.9549E − 17 | −2.6809E − 20 | 7.8795E − 24 |
| 16 | −1.0775E − 06 | 9.4275E − 10 | −1.1670E − 12 | 7.5071E − 16 | −2.3206E − 19 | 2.8308E − 23 |

Variable Spaces

| Focus Pos. | Space 1 T (2) | Space 2 T (15) | Focal Shift | Image Distance |
|---|---|---|---|---|
| 1 | 1.700 | 18.440 | −0.670 | −0.008 |
| 2 | 1.200 | 15.870 | −0.310 | 0.000 |

TABLE 3D-continued

| | | | | |
|---|---|---|---|---|
| 3 | 0.600 | 13.790 | −0.090 | −0.001 |
| 4 | 0.400 | 13.000 | 0.000 | −0.007 |

SYSTEM FIRST ORDER PROPERTIES, POS 1

| | | | | | |
|---|---|---|---|---|---|
| OBJ. HT: | −889.00 | f/ | 1.22 | MAG: | −0.0730 |
| STOP: | 0.00 after surface 5. | DIA: | 110.05 | | |
| EFL: | 130.620 | FVD: | 219.368 | ENP: | 51.9015 |
| IMD: | −.802219E − 02 | BRL: | 219.376 | EXP: | −80.5261 |
| OBD: | −1975.52 | OVL: | 2194.89 | | |

SYSTEM FIRST ORDER PROPERTIES, POS 2

| | | | | | |
|---|---|---|---|---|---|
| OBJ. HT: | −1400.0 | f/ | 1.19 | MAG: | −0.0470 |
| STOP: | 0.00 after surface 5. | DIA: | 109.56 | | |
| EFL: | 132.603 | FVD: | 216.306 | ENP: | 51.1680 |
| IMD: | −.192523E − 04 | BRL: | 216.306 | EXP: | −79.5264 |
| OBD: | −3009.08 | OVL: | 3225.38 | | |

SYSTEM FIRST ORDER PROPERTIES, POS 3

| | | | | | |
|---|---|---|---|---|---|
| OBJ. HT: | −2540.0 | f/ | 1.17 | MAG: | −0.0260 |
| STOP: | 0.00 after surface 5. | DIA: | 109.09 | | |
| EFL: | 134.234 | FVD: | 213.625 | ENP: | 50.2926 |
| IMD: | −.125494E − 02 | BRL: | 213.626 | EXP: | −78.7036 |
| OBD: | −5351.86 | OVL: | 5565.48 | | |

SYSTEM FIRST ORDER PROPERTIES, POS 4

| | | | | | |
|---|---|---|---|---|---|
| OBJ. HT: | −3700.0 | f/ | 1.17 | MAG: | −0.0180 |
| STOP: | 0.00 after surface 5. | DIA: | 109.09 | | |
| EFL: | 134.234 | FVD: | 213.625 | ENP: | 50.2926 |
| IMD: | −.125494E − 02 | BRL: | 213.626 | EXP: | −78.7036 |
| OBD | −5351.86 | OVL: | 5565.48 | | |

SYSTEM FIRST ORDER PROPERTIES, POS 4

| | | | | | |
|---|---|---|---|---|---|
| OBJ. HT: | −3700.0 | f/ | 1.17 | MAG: | −0.0180 |
| STOP: | 0.00 after surface 5. | DIA: | 108.48 | | |
| EFL: | 134.869 | FVD: | 212.629 | ENP: | 50.0020 |
| IMD: | −.671061E − 02 | BRL: | 212.636 | EXP: | −78.3878 |
| OBD: | −7682.22 | OVL: | 7894.85 | | |

First Order Properties of Elements

| Element Number | Surface Numbers | | Power | f' |
|---|---|---|---|---|
| 1 | 1 | 2 | 0.41567E − 02 | 240.58 |
| 2 | 3 | 4 | −0.13655E − 02 | −732.34 |
| 3 | 5 | 6 | −0.80324E − 02 | −124.50 |
| 4 | 7 | 8 | 0.74418E − 02 | 134.38 |
| 5 | 9 | 10 | 0.74418E − 02 | 134.38 |
| 6 | 11 | 12 | −0.19727E − 03 | −5069.2 |
| 7 | 14 | 15 | −0.22582E − 02 | −442.83 |
| 8 | 16 | 17 | 0.49404E − 03 | 2024.1 |
| 9 | 17 | 18 | −0.61714E − 02 | −162.04 |

TABLE 3E

| Surf. No. | Type | Radius | Thickness | Glass | Clear Aperture Diameter |
|---|---|---|---|---|---|
| 1 | ac | 128.0480 | 20.97000 | ACRYLIC | 127.00 |
| 2 | a | −1740.4991 | Space  1 | | 125.57 |
| 3 | ac | 136.1761 | 14.06000 | ACRYLIC | 122.00 |
| 4 | a | 95.4612 | 16.59000 | | 116.70 |
| 5 | | −570.5465 | 5.89000 | FD1 | 116.30 |
| 6 | | 107.3514 | 0.84986 | | 116.30 |
| 7 | | 112.0741 | 28.00000 | BACD5 | 116.40 |
| 8 | | −247.8398 | 0.20000 | | 117.10 |
| 9 | | 112.0741 | 28.00000 | BACD5 | 116.40 |
| 10 | | −247.8398 | 0.82000 | | 117.10 |
| 11 | ac | 4394.5410 | 9.00000 | ACRYLIC | 101.50 |
| 12 | a | 1589.9900 | 7.34591 | | 95.10 |
| 13 | | ∞ | 37.50000 | | 89.50 |
| 14 | a | −199.2794 | 8.23000 | ACRYLIC | 87.70 |
| 15 | ac | −2366.7481 | Space 2 | | 96.00 |
| 16 | a | −73.8501 | 4.00000 | ACRYLIC | 98.40 |
| 17 | | −70.0000 | 7.48000 | 432550 | 102.10 |

TABLE 3E-continued

| | | | | |
|---|---|---|---|---|
| 18 | ∞ | 10.30000 | 539590 | 130.00 |
| 19 | ∞ | Image distance | | 142.00 |

Symbol Description a - Polynomial asphere
c - Conic section

Conics

| Surface Number | Constant |
|---|---|
| 1 | −1.0000E + 00 |
| 3 | 1.4000E + 00 |
| 11 | 9.0000E + 01 |
| 15 | −1.2000E + 01 |

Even Polynomial Aspheres

| Surf. No. | D | E | F | G | H | I |
|---|---|---|---|---|---|---|
| 1  |  9.3374E − 08 | −3.6297E − 11 | −1.9177E − 15 |  2.6734E − 21 | −9.2665E − 22 |  8.8632E − 26 |
| 2  |  2.0635E − 07 | −7.1909E − 11 | −7.6716E − 15 |  2.5147E − 18 | −4.4906E − 22 |  7.5425E − 27 |
| 3  | −8.2429E − 07 |  1.8867E − 11 | −1.7902E − 14 |  1.0207E − 17 | −1.3591E − 21 |  2.6542E − 26 |
| 4  | −9.6081E − 07 |  4.9746E − 11 |  3.0592E − 14 | −9.4770E − 18 |  1.1908E − 21 | −1.1959E − 25 |
| 11 |  5.6055E − 07 | −1.7961E − 11 |  1.6771E − 14 | −1.5644E − 17 |  5.7995E − 21 | −1.5444E − 24 |
| 12 |  4.4506E − 07 |  1.5044E − 11 | −5.5971E − 14 |  2.7733E − 17 | −1.1835E − 20 |  8.0704E − 25 |
| 14 | −3.2974E − 06 | −3.6947E − 10 |  6.3662E − 13 | −4.1618E − 16 |  1.0864E − 19 | −3.9910E − 24 |
| 15 | −2.7996E − 06 |  6.7660E − 11 |  9.4756E − 14 |  1.9549E − 17 | −2.6809E − 20 |  7.8795E − 24 |
| 16 | −1.0775E − 06 |  9.4275E − 10 | −1.1670E − 12 |  7.5071E − 16 | −2.3206E − 19 |  2.8308E − 23 |

Variable Spaces

| Focus Pos. | Space 1 T (2) | Space 2 T (15) | Focal Shift | Image Distance |
|---|---|---|---|---|
| 1 | 3.389 | 20.562 | − 0.456 |  0.001 |
| 2 | 3.130 | 19.355 | − 0.312 |  0.000 |
| 3 | 2.748 | 17.671 | − 0.150 | − 0.002 |

SYSTEM FIRST ORDER PROPERTIES, POS 1

| | | | | | |
|---|---|---|---|---|---|
| OBJ. HT: | −762.00 | f/ | 1.20 | MAG: | −0.0860 |
| STOP: | 0.00 after surface 5. | DIA: | 114.35 | | |
| EFL: | 130.294 | FVD: | 223.187 | ENP: | 54.1698 |
| IMD: | 0.700414E − 03 | BRL: | 223.187 | EXP: | −81.3379 |
| OBD: | −1701.37 | OVL: | 1924.56 | | |

SYSTEM FIRST ORDER PROPERTIES, POS 2

| | | | | | |
|---|---|---|---|---|---|
| OBJ. HT: | −889.00 | f/ | 1.18 | MAG: | −0.0740 |
| STOP: | 0.00 after surface 5. | DIA: | 115.15 | | |
| EFL: | 131.202 | FVD: | 221.721 | ENP: | 53.7870 |
| IMD: | 0.344813E − 04 | BRL: | 221.721 | EXP: | −80.8776 |
| OBD: | −1960.03 | OVL: | 2181.75 | | |

SYSTEM FIRST ORDER PROPERTIES, POS 3

| | | | | | |
|---|---|---|---|---|---|
| OBJ. HT: | −1143.0 | f/ | 1.16 | MAG: | −0.0575 |
| STOP: | 0.00 after surface 5. | DIA: | 115.36 | | |
| EFL: | 132.489 | FVD: | 219.652 | ENP: | 53.2210 |
| IMD: | −.219466E − 02 | BRL: | 219.655 | EXP: | −80.2290 |
| OBD: | −2492.18 | OVL: | 2711.83 | | |

First Order Properties of Elements

| Element Number | Surface Numbers | | Power | f' |
|---|---|---|---|---|
| 1 | 1  | 2  |  0.41097E − 02 |   243.33 |
| 2 | 3  | 4  | −0.13655E − 02 |  −732.34 |
| 3 | 5  | 6  | −0.80324E − 02 |  −124.50 |
| 4 | 7  | 8  |  0.74418E − 02 |   134.38 |
| 5 | 9  | 10 |  0.74418E − 02 |   134.38 |
| 6 | 11 | 12 | −0.19727E − 03 | −5069.2 |
| 7 | 14 | 15 | −0.22582E − 02 |  −442.83 |
| 8 | 16 | 17 |  0.49404E − 03 |  2024.1 |
| 9 | 17 | 18 | −0.61714E − 02 |  −162.04 |

TABLE 4

| | Φ | $\Phi_{S1}$ | $\Phi_{S2}$ | $\Phi_1$ | $\Phi_2$ | $\Phi_{E4}$ | $\Phi_{CR}$ | $\Phi_3$ | $\Phi_{CR\&3}$ |
|---|---|---|---|---|---|---|---|---|---|
| 1  | .00749 | .00354 | −.00257 | .00138 | .00860 | −.00083 | −.00322 | −.00401 | −.00749 |
| 2  | .00749 | .00358 | −.00263 | .00137 | .00859 | −.00089 | −.00327 | −.00401 | −.00756 |
| 3A | .00754 | .00409 | −.00137 | .00301 | .00754 | −.00020 | −.00221 | −.00579 | −.00830 |
| 3B | .00771 | .00416 | −.00137 | .00308 | .00754 | −.00a20 | −.00226 | −.00579 | −.00838 |
| 3C | .00753 | .00414 | −.00137 | .00306 | .00754 | −.00020 | −.00226 | −.00579 | −.00833 |
| 3D | .00766 | .00416 | −.00137 | .00308 | .00754 | −.00020 | −.00226 | −.00579 | −.00836 |
| 3E | .00768 | .00411 | −.00137 | .00304 | .00754 | −.00020 | −.00226 | −.00579 | −.00839 | where
Φ is the optical power of the entire lens at the smallest screen magnification
$\Phi_{S1}$ is the optical power of the first element (also referred to as $\Phi_A$)
$\Phi_{S2}$ is the optical power of the second element (also referred to as $\Phi_B$)
$\Phi_1$ is the combined optical power of the first two elements
$\Phi_2$ is the combined optical power of the third through sixth elements
$\Phi_{E4}$ is the optical power of the sixth element (also referred to as $\Phi_F$)
$\Phi_{CR}$ is the optical power of the seventh element (also referred to as $\Phi_G$)
$\Phi_3$ is the optical power of the eighth element assembly (also referred to as $\Phi_H$)
$\Phi_{CR\&3}$ is the combined optical power of the seventh element through the eighth element assembly at the smallest screen magnification

TABLE 5

| | $R_{Min/Max}$[1] | Field Position[2] | MTF[3] | Range of Screen Diagonals | Minimum Screen Diagonal[4] |
|---|---|---|---|---|---|
| 1  | 0.73 | 85% | T | 4.02:1 | 1.84 |
| 2  | 0.77 | 70% | T | 4.02:1 | 1.84 |
| 3A | 0.74 | 85% | S | 2.57:1 | 2.24 |
| 3B | 0.54 | 70% | T | 1.50:1 | 1.52 |
| 3C | 0.58 | 85% | S | 1.68:1 | 2.22 |
| 3D | 0.62 | 85% | S | 4.16:1 | 1.78 |
| 3E | 0.83 | 85% | S | 1.50:1 | 1.52 |

[1] Minimum value.
[2] Field position at which minimum value of $R_{Min/Max}$ occurred in percent of maximum field.
[3] MTF for which minimum value of $R_{Min/Max}$ occurred where "S" represents sagittal and "T" represents tangential.
[4] Values reported are in meters and represent the full screen diagonal, i.e., twice the object heights in Tables 1, 2, and 3A-E.

TABLE 6

| | FIG. 1B | FIG. 1C | FIG. 1D |
|---|---|---|---|
| Focal Length | 134.93 | 133.45 | 136.32 |
| Magnification | −0.045 | −0.073 | −0.018 |
| F/Number | 1.10 | 1.14 | 1.07 |
| Object Height | −1500.00 | −920.00 | −3700.00 |
| Image Height | 67.32 | 67.33 | 65.65 |
| At Focus Position | 0.033 | 0.02 | 0.006 |
| Wavelengths (nm) | 546 | 546 | 546 |
| Weights | 1.0 | 1.0 | 1.0 |

What is claimed is:

1. A variable focus, front projection, lens system for forming an image on a screen which has a diagonal greater than 1.5 meters, said system being optically coupled to a cathode ray tube by a coupling fluid during use, said system and said coupling fluid having an optical power Φ, said system comprising in order from the system's image side:

(a) a first lens unit which primarily corrects aperture dependent aberrations, said first lens unit having an optical power $\Phi_1$ and comprising at least one aspherical surface;

(b) a second lens unit having an optical power $\Phi_2$ and comprising in order from the system's image side:
a negative, biconcave, first lens element composed of glass;
a positive, biconvex, second lens element composed of glass;
a positive, biconvex, third lens element composed of glass; and
a fourth lens element which comprises at least one aspherical surface and is composed of plastic:

(c) a corrector lens unit having an optical power $\Phi_{CR}$ and comprising at least one aspherical surface; and (d) a third lens unit which provides correction for the field curvature of the lens system, said third lens unit comprising a lens element which is in contact with said coupling fluid during use of the lens system and which has two surfaces both of which are concave to the image, said third lens unit and said coupling fluid having an optical power $\Phi_3$;

wherein (i) $\Phi_1 > 0$;
(ii) $\Phi_2/\Phi > 0.7$;
(iii) $\Phi_{CR} < 0$;
(iv) $\Phi_3 < 0$;
(v) the corrector lens unit and the third lens unit are separated by a distance $D_{CR/3}$ which is varied during focusing of the image on the screen, said focusing being able to accommodate a range of screen diagonals of at least 1.5:1; and
(vi) said lens system and coupling fluid have a modulation transfer function at the cathode ray tube which varies over said range of screen diagonals such that the ratio $R_{Min/Max}$ of the minimum value of the modulation transfer function at 5 cycles/millimeter to the maximum value of the modulation transfer function at 5 cycles/millimeter over said range of screen diagonals for any field position up to 0.85 of the maximum field is greater than 0.5.

2. The variable focus, front projection, lens system of claim 1 wherein $R_{Min/Max}$ is greater than 0.7.

3. The variable focus, front projection, lens system of claim 1 wherein the range of screen diagonals is at least 3.0:1.

4. The variable focus, front projection, lens system of claim 1 wherein the first lens unit comprises a first subunit having an optical power $\Phi_{S1}$ and a second subunit having an optical power $\Phi_{S2}$, where:

$\Phi_{S1} > 0$; and $\Phi_{S2} < 0$.

5. The variable focus, front projection, lens system of claim 4 where:

$\Phi_{S1}/\Phi > 0.4$; and $|\Phi_{S2}|/\Phi < 0.4$.

6. The variable focus, front projection, lens system of claim 4 wherein each of the first and second subunits comprises at least one aspherical surface.

7. The variable focus, front projection, lens system of claim 4 wherein each of the first and second subunits consists of a single plastic lens element.

8. The variable focus, front projection, lens system of claim 4 wherein the first subunit and the second subunit are separated by a distance $D_{S1/S2}$ which is varied during focusing of the image.

9. The variable focus, front projection, lens system of claim 1 wherein the fourth lens element has an optical power $\Phi_{E4}$ where:

$|\Phi_{E4}|/\Phi < 0.2$.

10. The variable focus, front projection, lens system of claim 1 wherein the corrector lens unit consists of a single plastic lens element both of whose surfaces have an overall shape which is concave to the image.

11. The variable focus, front projection, lens system of claim 1 wherein the third lens unit comprises an aspherical surface.

12. A projection television system comprising a cathode ray tube and a projection lens system for projecting light from the cathode ray tube onto a screen to form an image, said projection lens system comprising the variable focus, front projection, lens system of claim 1.

13. A projection television system comprising three cathode ray tubes and three projection lens systems, one projection lens system being associated with each of the cathode ray tubes for projecting light from that tube onto a common screen to form an image, each projection lens system comprising the variable focus, front projection, lens system of claim 1.

14. A variable focus, front projection, lens system for forming an image on a screen which has a diagonal greater than 1.5 meters, said system being optically coupled to a cathode ray tube by a coupling fluid during use, said system and said coupling fluid having an optical power $\Phi$, said system comprising in order from the system's image side:

(a) a first lens unit which primarily corrects aperture dependent aberrations, said first lens unit having an optical power $\Phi_1$ and comprising a first subunit having an optical power $\Phi_{S1}$ and a second subunit having an optical power $\Phi_{S2}$, each of said subunits having at least one aspherical surface;

(b) a second lens unit having an optical power $\Phi_2$ and comprising in order from the system's image side:
a negative first lens element composed of glass;
a positive second lens element composed of glass;
a positive third lens element composed of glass; and
a fourth lens element which comprises at least one aspherical surface;

(c) a corrector lens unit having an optical power $\Phi_{CR}$ and comprising a plastic lens element both of whose surfaces have an overall shape which is concave to the image and at least one of whose surfaces is aspherical; and (d) a third lens unit which provides correction for the field curvature of the lens system, said third lens unit comprising a lens element which is in contact with said coupling fluid during use of the lens system and which has two surfaces both of which are concave to the image, said third lens unit and said coupling fluid having an optical power $\Phi_3$;

wherein
(i) $\Phi_1 > 0$;
(ii) $\Phi_{S1} > 0$;
(iii) $\Phi_{S2} < 0$;
(iv) $\Phi_2/\Phi > 0.7$;
(v) $\Phi_{CR} < 0$;
(vi) $\Phi_3 < 0$;
(vii) the corrector lens unit and the third lens unit are separated by a distance $D_{CR/3}$ which is varied during focusing of the image on the screen, said focusing being able to accommodate a range of screen diagonals of at least 1.5:1; and
(viii) said lens system and coupling fluid have a modulation transfer function at the cathode ray tube which varies over said range of screen diagonals such that the ratio $R_{Min/Max}$ of the minimum value of the modulation transfer function at 5 cycles/millimeter to the maximum value of the modulation transfer function at 5 cycles/millimeter over said range of screen diagonals for any field position up to 0.85 of the maximum field is greater than 0.5.

15. The variable focus, front projection, lens system of claim 14 wherein $R_{Min/Max}$ is greater than 0.7.

16. The variable focus, front projection, lens system of claim 14 wherein the range of screen diagonals is at least 3.0:1.

17. The variable focus, front projection, lens system of claim 16 wherein the first subunit and the second subunit of the first lens unit are separated by a distance $D_{S1/S2}$ which is varied during focusing of the image.

18. The variable focus, front projection, lens system of claim 14 where:

$\Phi_{S1}/\Phi > 0.4$; and $|\Phi_{S2}|/\Phi < 0.4$.

19. The variable focus, front projection, lens system of claim 14 wherein each of the first and second subunits of the first lens unit consists of a single plastic lens element.

20. The variable focus, front projection, lens system of claim 14 wherein the negative first lens element of the second lens unit is biconcave, the positive second lens element of that unit is biconvex, the positive third lens element of that unit is biconvex, and the fourth lens element of that unit is composed of plastic.

21. The variable focus, front projection, lens system of claim 14 wherein the fourth lens element of the second lens unit has an optical power $\Phi_{E4}$ where:

$|\Phi_{E4}|/\Phi < 0.2$.

22. The variable focus, front projection, lens system of claim 14 wherein the third lens unit comprises an aspherical surface.

23. A projection television system comprising a cathode ray tube and a projection lens system for projecting light from the cathode ray tube onto a screen to form an image, said projection lens system comprising the variable focus, front projection, lens system of claim 14.

24. A projection television system comprising three cathode ray tubes and three projection lens systems, one projection lens system being associated with each of the cathode ray tubes for projecting light from that tube onto a common screen to form an image, each projection lens system comprising the variable focus, front projection, lens system of claim 14.

25. A projection lens system for forming an image on a screen, said system being optically coupled to a cathode ray tube by a coupling fluid during use, said system and said coupling fluid having an optical power $\Phi$, said system comprising in order from the system's image side:

(a) a lens element of optical power $\Phi_A$ which is composed of plastic and has at least one aspherical surface;

(b) a lens element of optical power $\Phi_B$ which is composed of plastic and has at least one aspherical surface;

(c) a lens element of optical power $\Phi_C$ which is composed of glass;

(d) a lens element of optical power $\Phi_D$ which is composed of glass and is biconvex;

(e) a lens element of optical power $\Phi_E$ which is composed of glass and is biconvex;

(f) a lens element of optical power $\Phi_F$ which is composed of plastic and has at least one aspherical surface;

(g) a lens element of optical power $\Phi_G$ which is composed of plastic, the surfaces of said lens element each having an overall shape which is concave to the image and at least one of said surfaces being aspherical; and (h) a lens unit which provides correction for the field curvature of the lens system, said lens unit comprising a lens element which is in contact with said coupling fluid during use of the lens system, is composed of plastic, and has two surfaces both of which are concave to the image and at least one of which is aspherical, said lens unit and said coupling fluid having an optical power $\Phi_H$;

wherein (i) $\Phi_A$, $\Phi_D$, and $\Phi_E$ are each>0;

(ii) $\Phi_B$, $\Phi_C$, $\Phi_G$, and $\Phi_H$ are each<0;

(iii) $\Phi_A/\Phi>0.4$;

(iv) $|\Phi_B|/\Phi<0.4$; and (v) $|\Phi_F|/\Phi<0.2$;

and wherein the lens element having an optical power $\Phi_G$ and the lens unit are separated by a distance which is varied during focusing of the image on the screen.

26. The projection lens system of claim 25 wherein said focusing is able to accommodate a range of screen diagonals of at least 1.5:1 and said lens system and coupling fluid have a modulation transfer function at the cathode ray tube which varies over said range of screen diagonals such that the ratio $R_{Min/Max}$ of the minimum value of the modulation transfer function at 5 cycles/millimeter to the maximum value of the modulation transfer function at 5 cycles/millimeter over said range of screen diagonals for any field position up to 0.85 of the maximum field is greater than 0.5.

27. The projection lens system of claim 26 wherein $R_{Min/Max}$ is greater than 0.7.

28. The projection lens system of claim 26 wherein the range of screen diagonals is at least 3.0:1.

29. The projection lens system of claim 28 wherein the distance between the lens element having an optical power $\Phi_A$ and the lens element having an optical power $\Phi_B$ is varied during focusing of the image.

30. A projection television system comprising a cathode ray tube and a projection lens system for projecting light from the cathode ray tube onto a screen to form an image, said projection lens system comprising the projection lens system of claim 25.

31. A projection television system comprising three cathode ray tubes and three projection lens systems, one projection lens system being associated with each of the cathode ray tubes for projecting light from that tube onto a common screen to form an image, each projection lens system comprising the projection lens system of claim 25.

32. A variable focus, front projection, lens system for forming an image on a screen which has a diagonal greater than 1.5 meters, said system being optically coupled to a cathode ray tube by a coupling fluid during use, said system and said coupling fluid having an optical power $\Phi$, said system comprising in order from the system's image side:

(a) a first lens unit which primarily corrects aperture dependent aberrations, said first lens unit having an optical power $\Phi_1$ and comprising at least one aspherical surface;

(b) a second lens unit having an optical power $\Phi_2$ and comprising in order from the system's image side:
a negative first lens element composed of glass;
a positive second lens element composed of glass;
a positive third lens element composed of glass; and
a fourth lens element which comprises at least one aspherical surface and has an optical power $\Phi_{E4}$;

(c) a corrector lens unit having an optical power $\Phi_{CR}$ and comprising at least one aspherical surface; and (d) a third lens unit which provides correction for the field curvature of the lens system, said third lens unit comprising a lens element which is in contact with said coupling fluid during use of the lens system and which has two surfaces both of which are concave to the image, said third lens unit and said coupling fluid having an optical power $\Phi_3$;

wherein (i) $\Phi_1>0$;

(ii) $\Phi_2/\Phi>0.7$;

(iii) $\Phi_{CR}<0$;

(iv) $\Phi_3<0$;

(v) $|\Phi_{E4}|/\Phi<0.2$;

(vi) the corrector lens unit and the third lens unit are separated by a distance $D_{CR/3}$ which is varied during focusing of the image on the screen, said focusing being able to accommodate a range of screen diagonals of at least 1.5:1; and (vii) said lens system and coupling fluid have a modulation transfer function at the cathode ray tube which varies over said range of screen diagonals such that the ratio $R_{Min/Max}$ of the minimum value of the modulation transfer function at 5 cycles/millimeter to the maximum value of the modulation transfer function at 5 cycles/millimeter over said range of screen diagonals for any field position up to 0.85 of the maximum field is greater than 0.5.

33. A projection television system comprising a cathode ray tube and a projection lens system for projecting light from the cathode ray tube onto a screen to form an image, said projection lens system comprising the variable focus, front projection, lens system of claim 32.

34. A projection television system comprising three cathode ray tubes and three projection lens systems, one projection lens system being associated with each of the cathode ray tubes for projecting light from that tube onto a common screen to form an image, each projection lens system comprising the variable focus, front projection, lens system of claim 32.

35. A variable focus, front projection, lens system for forming an image on a screen which has a diagonal greater than 1.5 meters, said system being optically coupled to a cathode ray tube by a coupling fluid during use, said system and said coupling fluid having an optical power $\Phi$, said system comprising in order from the system's image side:

(a) a first lens unit which primarily corrects aperture dependent aberrations, said first lens unit having an optical power $\Phi_1$ and comprising in order from the system's image side:
a first subunit having an optical power $\Phi_{S1}$; and
a second subunit having an optical power $\Phi_{S2}$; where at least one of said first and second subunits comprises an aspherical surface and where:

$\Phi_{S1} > 0$; and $\Phi_{S2} < 0$;

(b) a second lens unit having an optical power $\Phi_2$ and comprising at least one aspherical surface;

(c) a corrector lens unit having an optical power $\Phi_{CR}$ and comprising at least one aspherical surface; and (d) a third lens unit which provides correction for the field curvature of the lens system, said third lens unit comprising a lens element which is in contact with said coupling fluid during use of the lens system and which has two surfaces both of which are concave to the image, said third lens unit and said coupling fluid having an optical power $\Phi_3$;

wherein (i) $\Phi_1 > 0$;

(ii) $\Phi_2/\Phi > 0.7$;

(iii) $\Phi_{CR} < 0$;

(iv) $\Phi_3 < 0$;

(v) the corrector lens unit and the third lens unit are separated by a distance $D_{CR/3}$ which is varied during focusing of the image on the screen, said focusing being able to accommodate a range of screen diagonals of at least 1.5:1; and (vi) said lens system and coupling fluid have a modulation transfer function at the cathode ray tube which varies over said range of screen diagonals such that the ratio $R_{Min/Max}$ of the minimum value of the modulation transfer function at 5 cycles/millimeter to the maximum value of the modulation transfer function at 5 cycles/millimeter over said range of screen diagonals for any field position up to 0.85 of the maximum field is greater than 0.5.

36. The variable focus, front projection, lens system of claim 35 where:

$\Phi_{S1}/\Phi > 0.4$; and $|\Phi_{S2}|/\Phi < 0.4$.

37. The variable focus, front projection, lens system of claim 35 wherein each of the first and second subunits comprises at least one aspherical surface.

38. The variable focus, front projection, lens system of claim 35 wherein each of the first and second subunits consists of a single plastic lens element.

39. The variable focus, front projection, lens system of claim 35 wherein the first subunit and the second subunit are separated by a distance $D_{S1/S2}$ which is varied during focusing of the image.

40. A projection television system comprising a cathode ray tube and a projection lens system for projecting light from the cathode ray tube onto a screen to form an image, said projection lens system comprising the variable focus, front projection, lens system of claim 35.

41. A projection television system comprising three cathode ray tubes and three projection lens systems, one projection lens system being associated with each of the cathode ray tubes for projecting light from that tube onto a common screen to form an image, each projection lens system comprising the variable focus, front projection, lens system of claim 35.

* * * * *

UNITED STATES PATENT AND TRADEMARK OFFICE
CERTIFICATE OF CORRECTION

PATENT NO. : 5,936,776
DATED : August 10, 1999
INVENTOR(S) : Melvyn H. Kreitzer

It is certified that error appears in the above-identified patent and that said Letters Patent is hereby corrected as shown below:

| Col. | Table | |
|---|---|---|
| 8 | 1 | Under <u>SYSTEM FIRST ORDER PROPERTIES, POS 1</u>, change "ENP: 75.7495" to "ENP: 75.7485" |
| 11 | 3A | Surf. No. 13, under Radius, change "28" to "∞" |
| 15 | 3B | Under <u>Even Polynomial Aspheres</u>, Surf. No. 15, Column F, change "5.4756E-14" to "9.4756E-14" |
| 20 | 3D | First section, Surf. No. 2, move "119.40" to last column |
| 21/22 | 3D | Under <u>SYSTEM FIRST ORDER PROPERTIES, POS. 4</u>, this section is included twice. Delete the first version which contains incorrect values. |
| 25 | 4 | Line 3B, under $\Phi_{E4}$, change "-.00a20" to "-.00020" |

Signed and Sealed this

Thirteenth Day of June, 2000

Attest:

Attesting Officer

Q. TODD DICKINSON

Director of Patents and Trademarks